United States Patent
Song et al.

(10) Patent No.: US 12,546,528 B2
(45) Date of Patent: Feb. 10, 2026

(54) REFRIGERATOR AND CONTROL METHOD THEREOF

(71) Applicant: LG ELECTRONICS INC., Seoul (KR)

(72) Inventors: Youngseung Song, Seoul (KR); Yun Su Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 332 days.

(21) Appl. No.: 18/266,781

(22) PCT Filed: Nov. 12, 2021

(86) PCT No.: PCT/KR2021/016572
§ 371 (c)(1),
(2) Date: Jun. 12, 2023

(87) PCT Pub. No.: WO2022/131560
PCT Pub. Date: Jun. 23, 2022

(65) Prior Publication Data
US 2024/0302092 A1 Sep. 12, 2024

(30) Foreign Application Priority Data

Dec. 14, 2020 (KR) .................. 10-2020-0174458
Dec. 14, 2020 (KR) .................. 10-2020-0174459

(51) Int. Cl.
*F25D 23/02* (2006.01)

(52) U.S. Cl.
CPC ........ *F25D 23/028* (2013.01); *F25D 2600/06* (2013.01); *F25D 2700/02* (2013.01); *F25D 2700/12* (2013.01)

(58) Field of Classification Search
CPC ........ F25D 23/028; F25D 11/00; F25D 11/02; F25D 29/00; F25D 2600/06; F25D 2700/02; F25D 2700/12
See application file for complete search history.

(56) References Cited

FOREIGN PATENT DOCUMENTS

| KR | 20010019695 A | * | 3/2001 | ............. F25D 29/00 |
| KR | 20140019594 A | * | 2/2014 | ............. F25D 29/00 |
| KR | 20180055242 A | * | 5/2018 | ........... F25D 23/025 |

OTHER PUBLICATIONS

Machine translation KR 20140019594 (Year: 2014).*
Machine Translation KR20010019695 (Year: 2001).*
Machine Translation KR20180055242 (Year: 2018).*

* cited by examiner

*Primary Examiner* — Joseph F Trpisovsky
(74) *Attorney, Agent, or Firm* — Bryan Cave Leighton Paisner LLP

(57) ABSTRACT

A refrigerator and a control method thereof of the present disclosure allows a controller to perform a load operation when the load operation start condition is satisfied when a door is opened, and when an operation release condition is satisfied, the load operation is controlled to be released and switched (or maintained) to a normal storage operation.

16 Claims, 14 Drawing Sheets

[Figure 1]
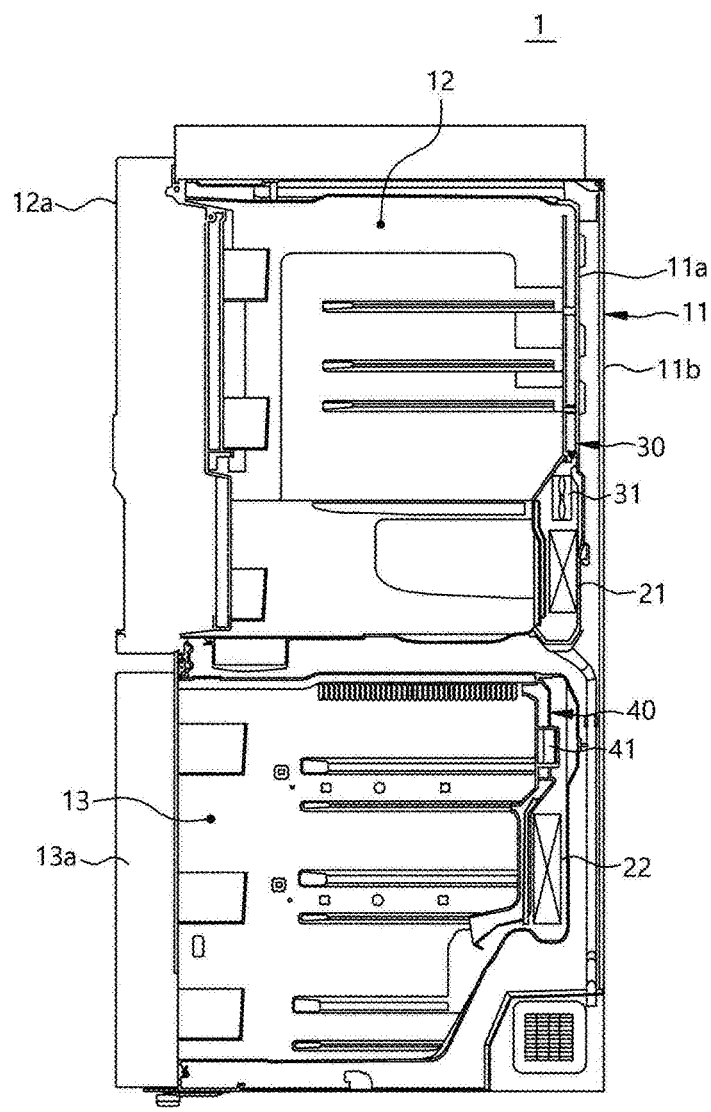

[Figure 2]
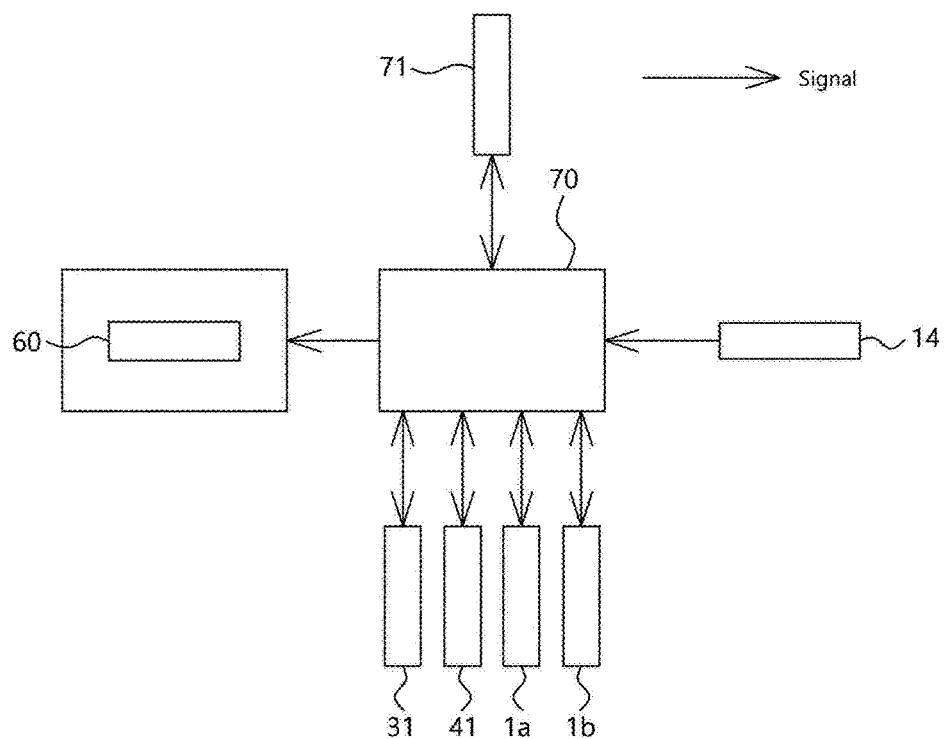
[Figure 3]
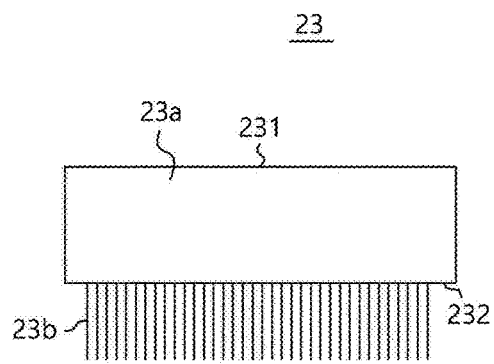

[Figure 4]
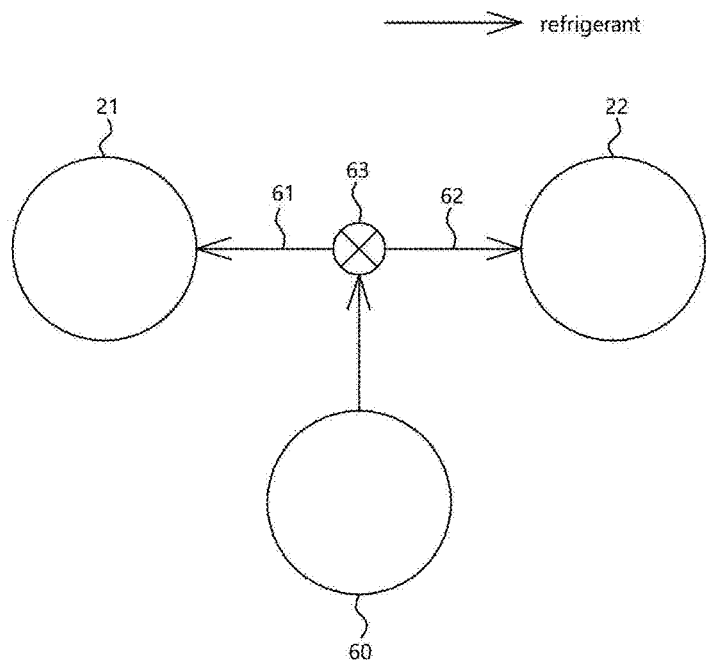
[Figure 5]
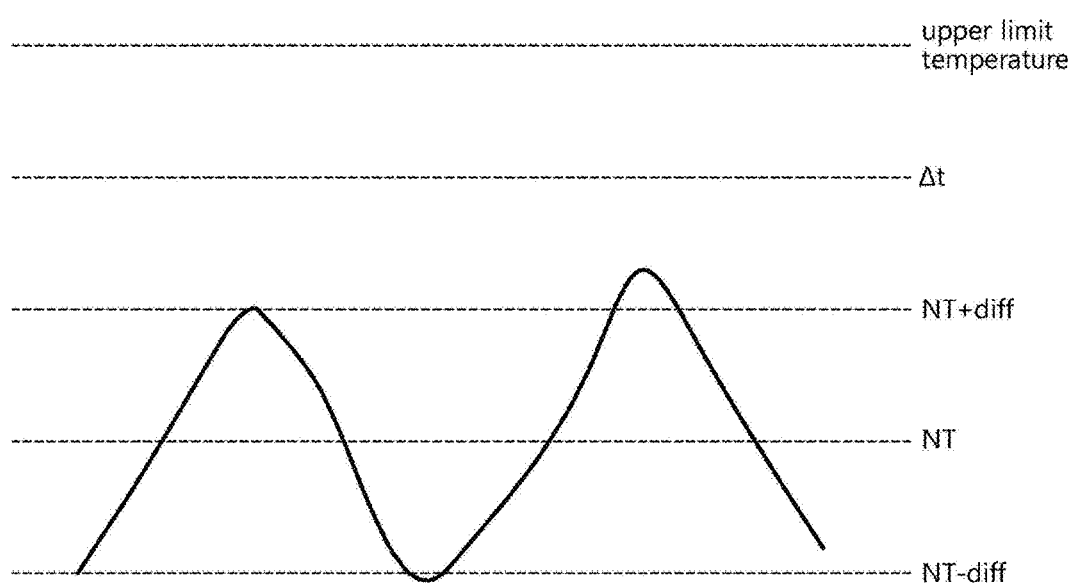

[Figure 6]
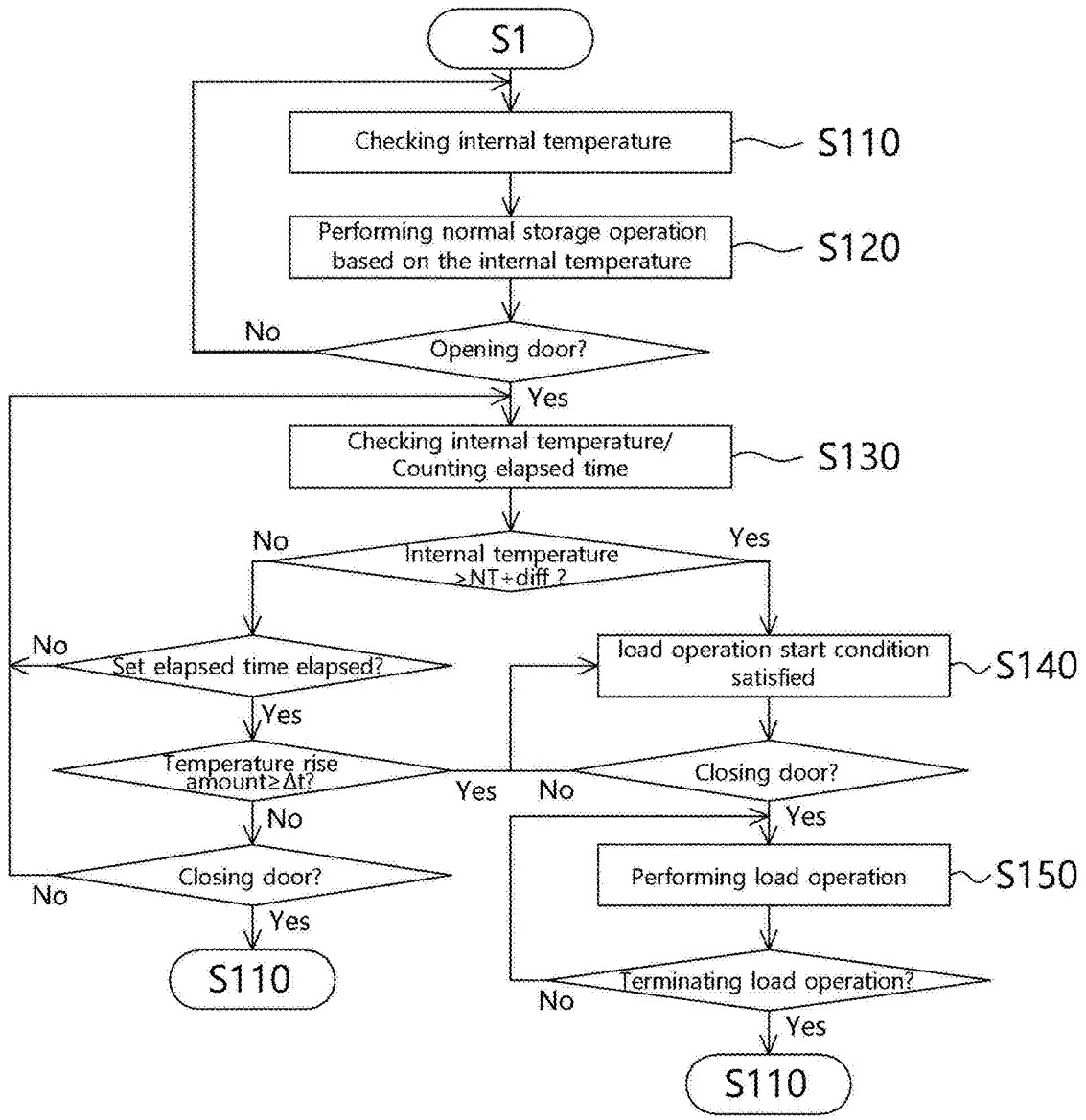

[Figure 7]
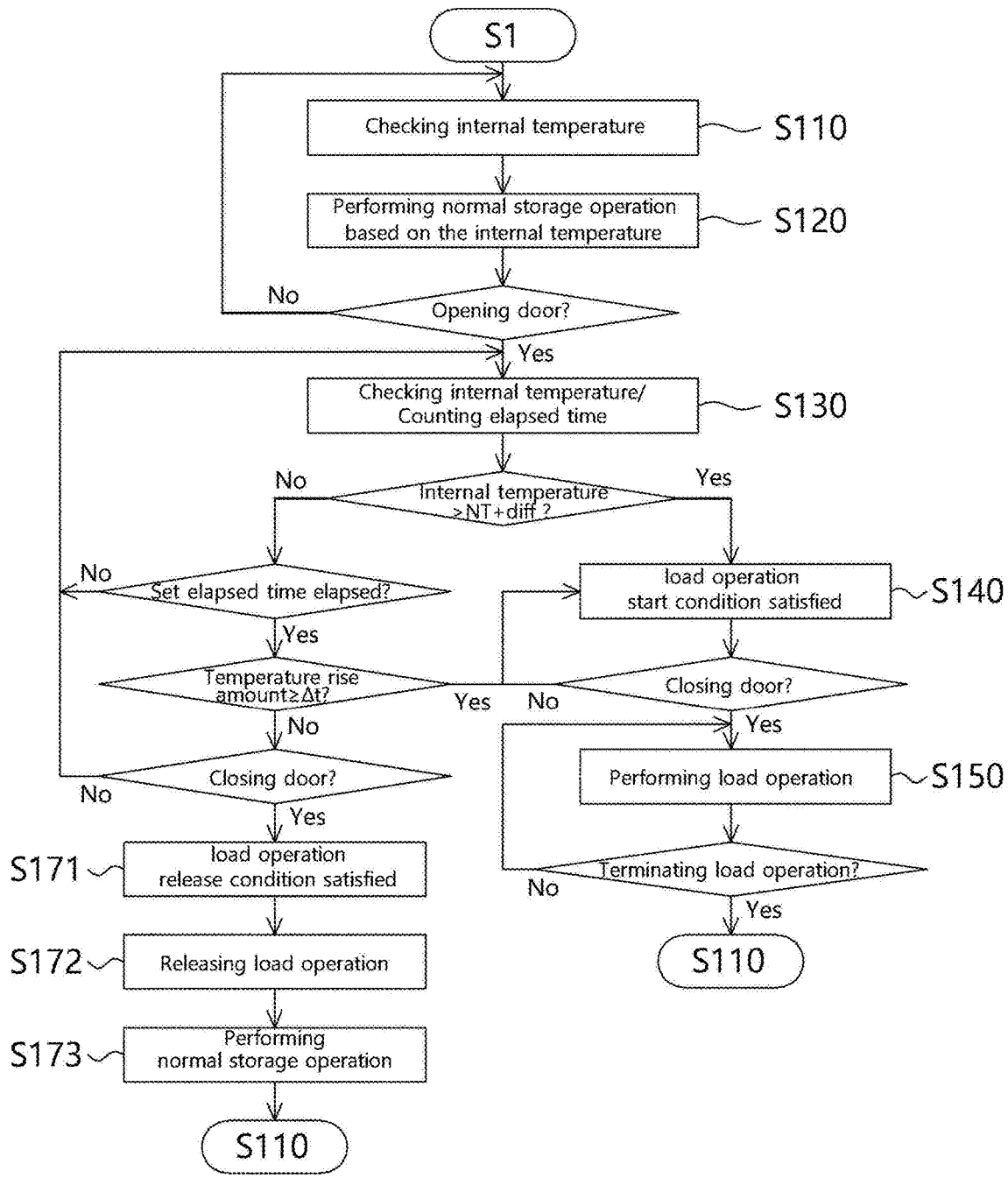

[Figure 8]
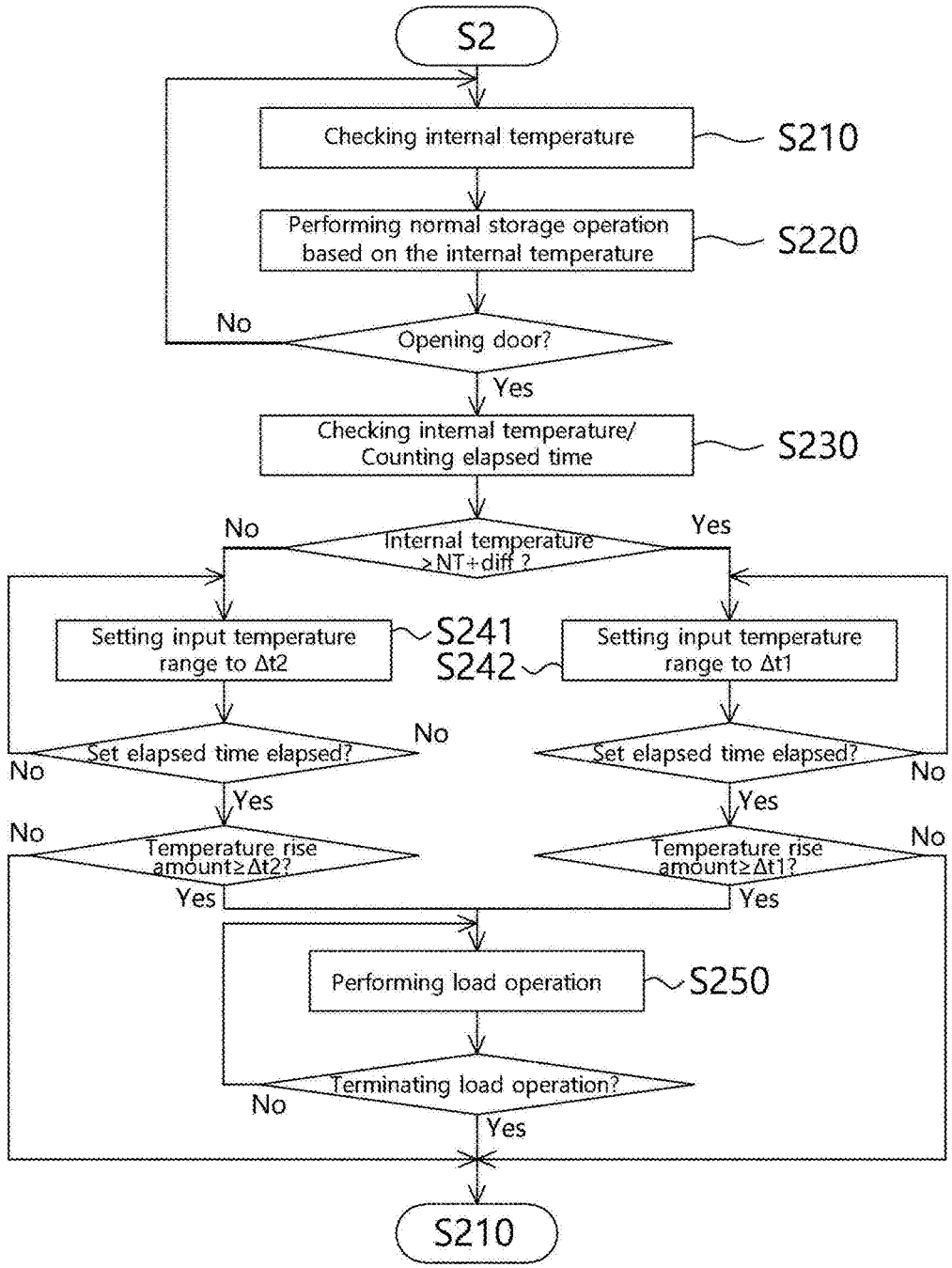

[Figure 9]
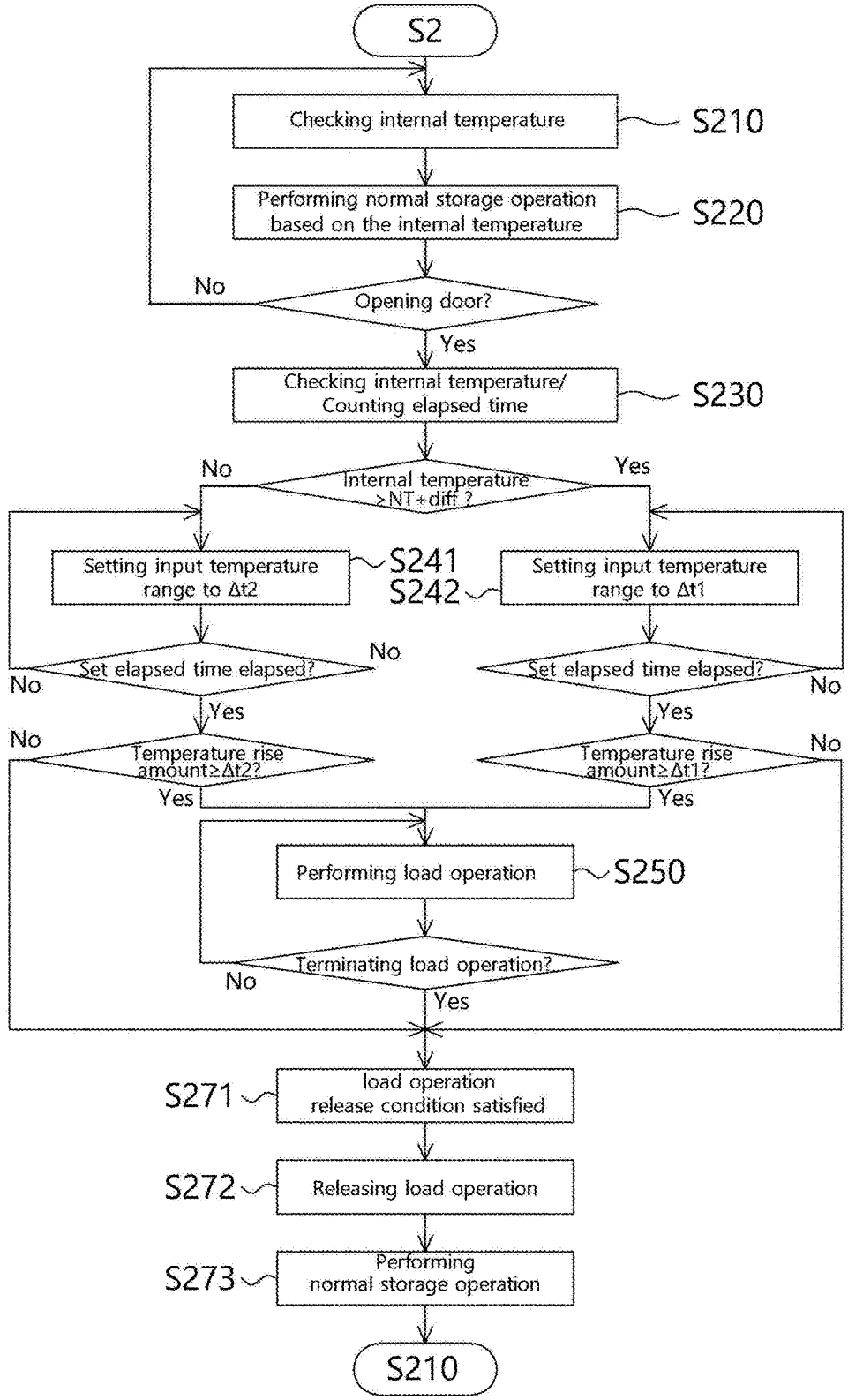

【Figure 10】
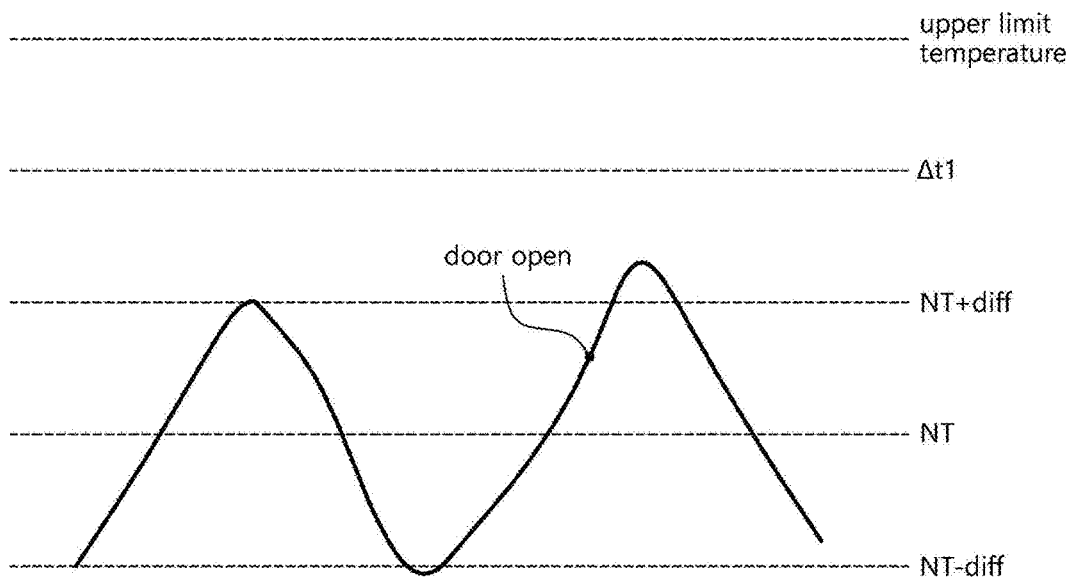
【Figure 11】
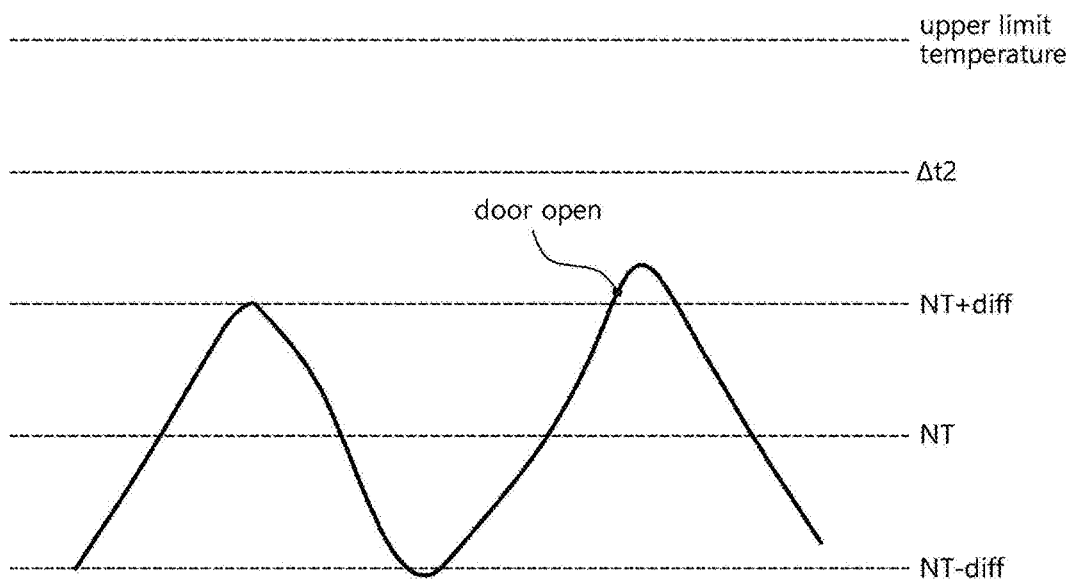

[Figure 12]
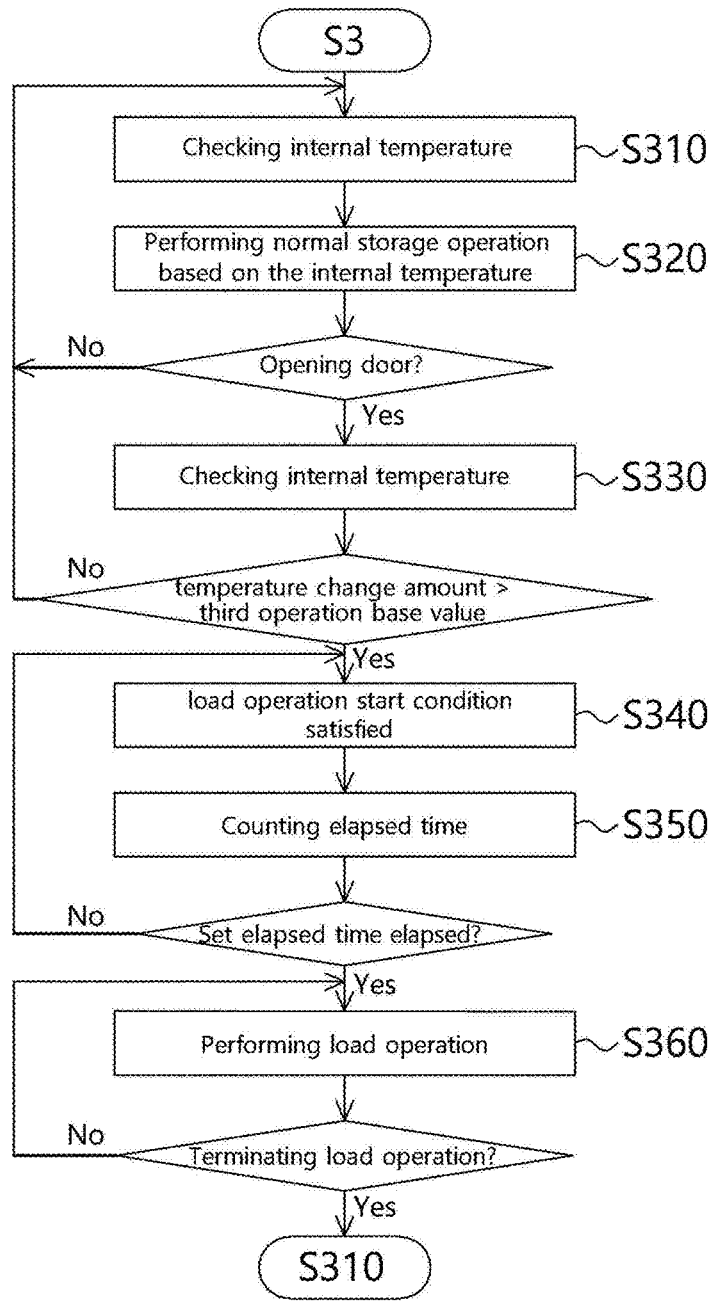

[Figure 13]
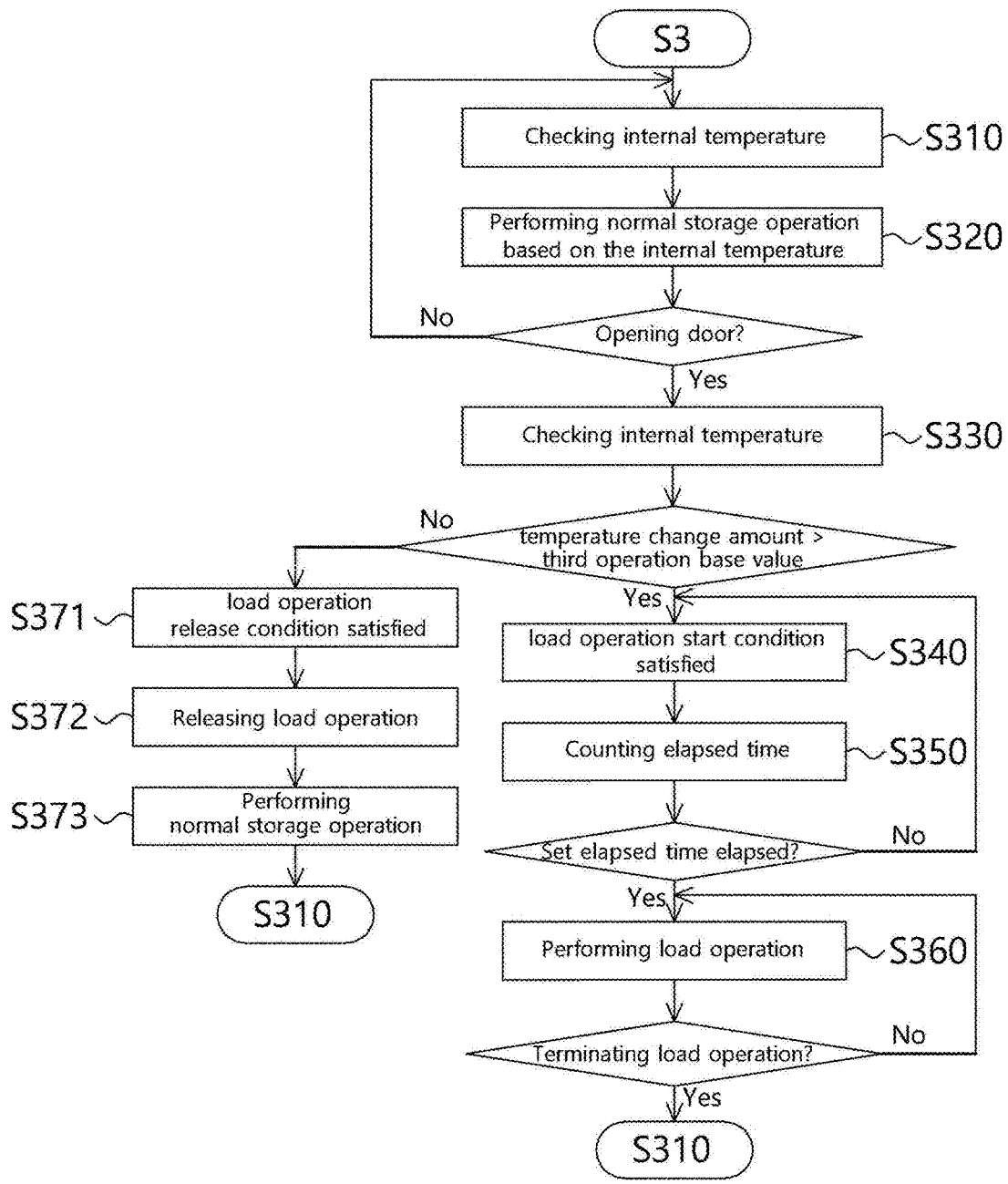

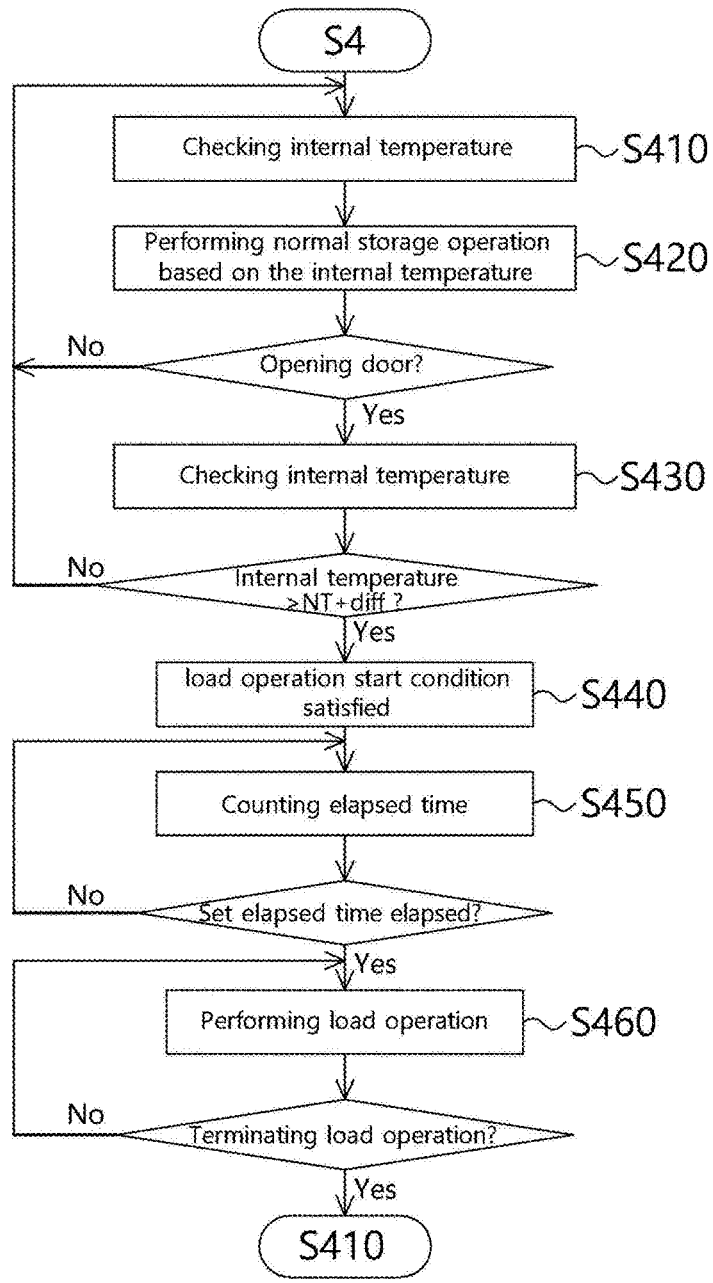
[Figure 14]

[Figure 15]
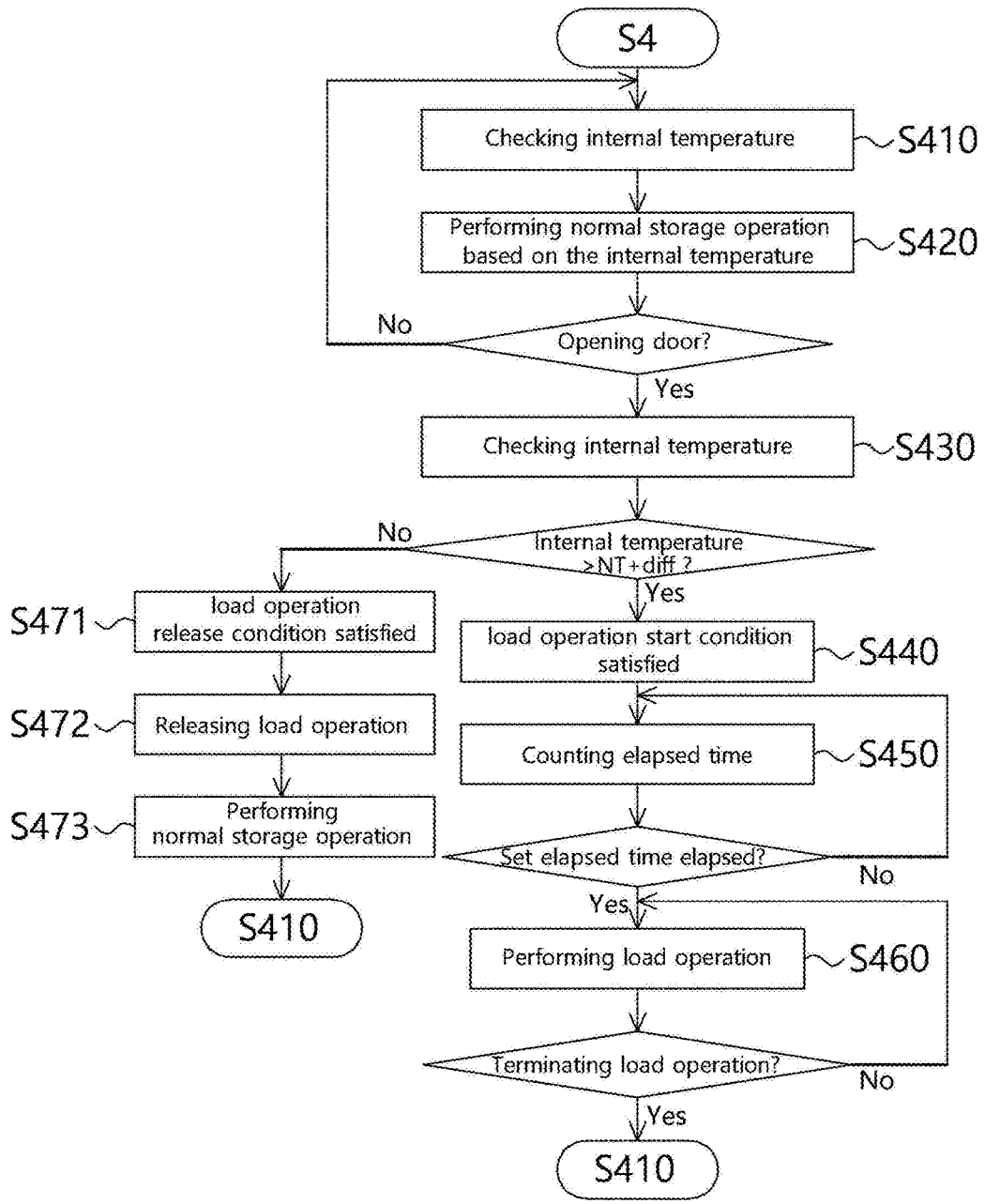

[Figure 16]
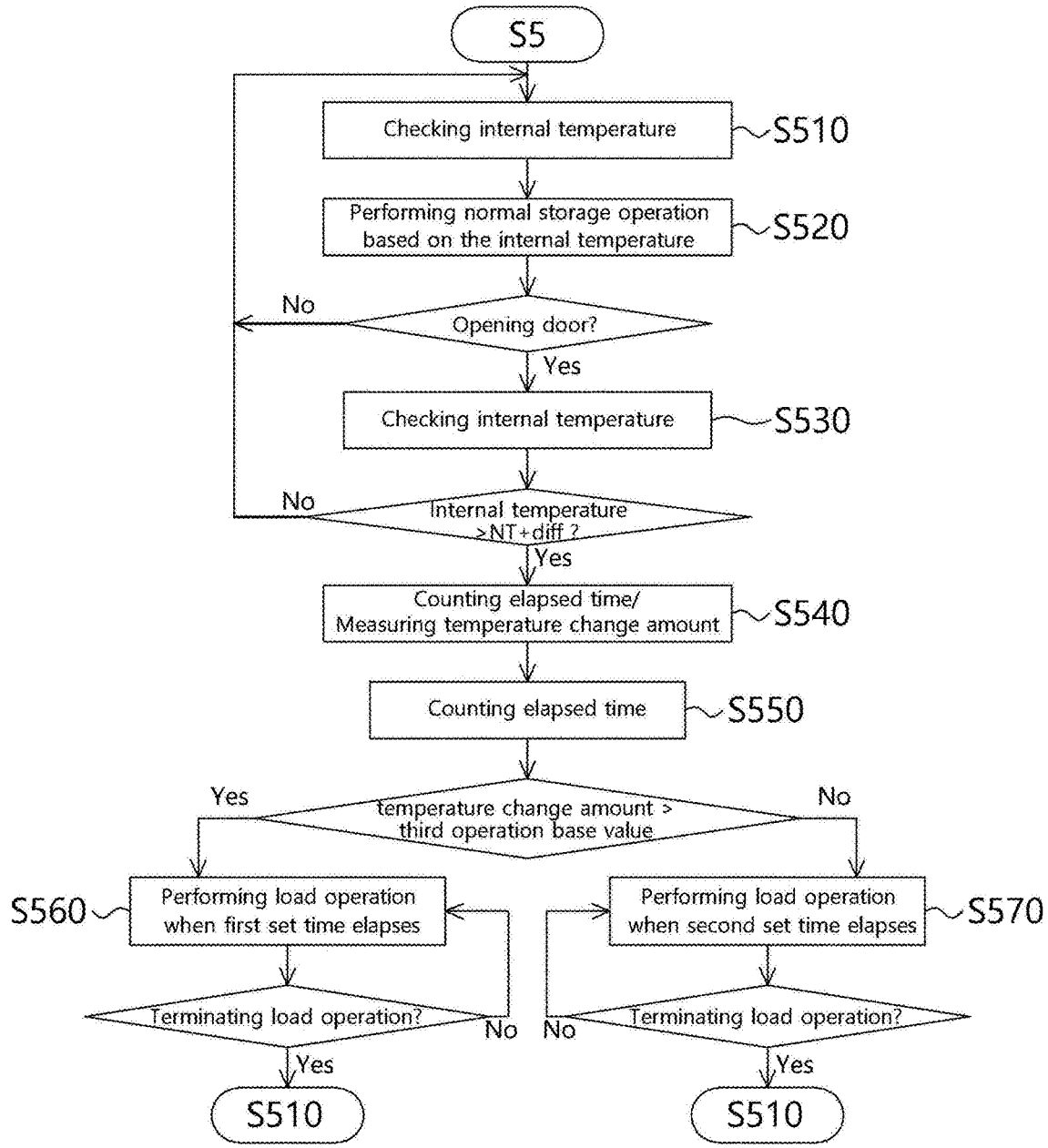

【Figure 17】
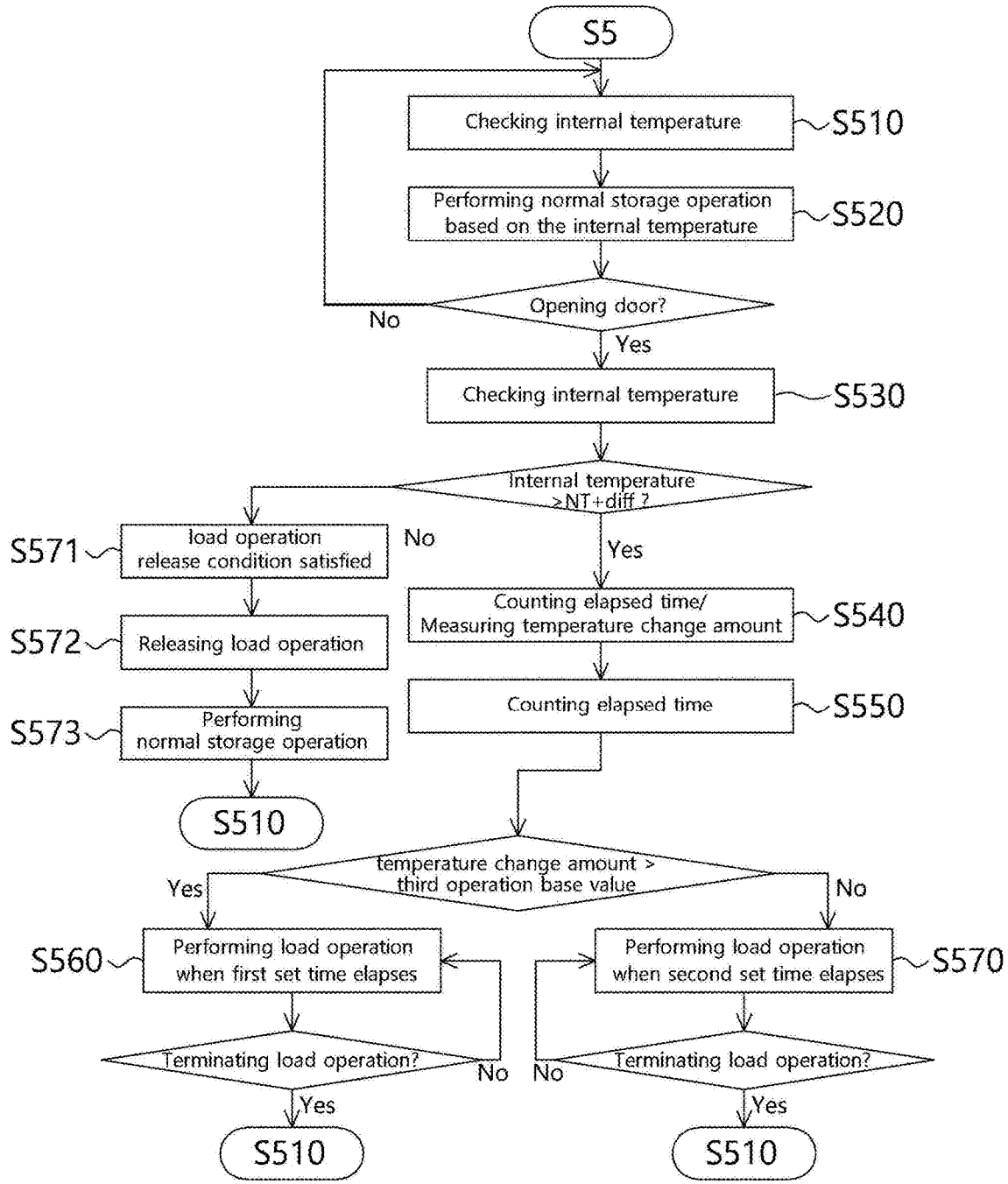

REFRIGERATOR AND CONTROL METHOD THEREOF

CROSS REFERENCE TO RELATED APPLICATION

This application is a National Phase application under 35 U.S.C. 371 of International Application No. PCT/KR2021/016572, filed on Nov. 12, 2021, which claims the benefit of Korean Application No. 10-2020-0174458, filed on Dec. 14 2020, and 10-2020-0174459, filed on Dec. 14 2020, the contents of which are incorporated by reference herein in their entirety.

TECHNICAL FIELD

The present disclosure relates to a refrigerator and control method thereof, which may improve power consumption by relieving excessive temperature rise in the refrigerator caused by opening a door.

BACKGROUND ART

In general, a refrigerator is a device that may store objects in a storage space for a long time or while maintaining a constant temperature by using cold air.

The refrigerator includes a refrigeration system including a compressor and an evaporator to generate and circulate cold air.

A temperature control for a storage compartment operates the compressor to supply cold air into the storage compartment when the temperature rises further than an upper limit notch temperature (NT+diff) based on a set notch temperature (NT) of the storage compartment, and when the temperature decreases further than a lower limit notch temperature (NT−diff) based on the set notch temperature (NT), the operation of the compressor is stopped to block the cold air supplied to the storage compartment.

Meanwhile, the temperature in the storage compartment may rise even though the refrigeration system is not broken during a normal storage operation for the storage compartment.

It may be a case when hot food is stored in the storage compartment or when an indoor air outside the refrigerator is introduced into the refrigerator as a door of the refrigerator is opened for a long time.

Accordingly, when a door is opened, a load operation is performed with higher output (output of the compressor) than the normal storage operation to quickly reach a normal storage temperature inside the storage compartment.

While the load operation has an advantage of protecting food in the storage compartment by quickly stabilizing the temperature of the storage compartment, it also has a disadvantage of lowering the power efficiency.

In relation to the load operation, various methods are provided, such as Korean Patent No. 10-2017-0087440, Korean Patent No. 10-2020-0105183, and Korean Patent No. 10-2020-0087049.

However, in the prior arts, when measuring power consumption for a refrigerator, it is measured only by performing a normal storage operation without opening and closing the door, so efforts for efficient load operation are insufficient.

Since the conventional measurement of power consumption of the refrigerator is carried without considering the consumers' actual use (the behavior of opening and closing the door frequently), complaints have arisen that there is discrepancy between the measurement of conventional power consumption and the power consumption experienced by consumers during actual use.

Of course, there are also efforts to efficiently perform the load operation so as to prevent a decrease in power consumption as in Korean Patent No. 10-2018-0055242.

That is, even when a door is opened, the load operation is performed only when a certain condition (for example, the temperature rises by 2° C. or more within 5 minutes after the door is opened) is satisfied, thereby improving power consumption.

However, the above-described prior art has a disadvantage in that it may not simultaneously satisfy all situations in actual use because the time condition and the temperature change condition must be satisfied at the same time.

For example, in the prior art, when a temperature of the refrigerator at the time of opening the door is between the set notch temperature (NT) and the upper limit notch temperature (NT+diff), or is higher than the upper limit notch temperature (NT+diff), the deterioration of food may occur. That is, in the prior art, even if the temperature of the refrigerator is close to a dissatisfaction region, the load operation is not performed unless the temperature change of 2° C. occurs. Accordingly, even when the temperature does not exceed 2° C. within 5 minutes after opening the door, if the upper limit notch temperature (NT+diff) is exceeded, the food may not be safely protected.

In addition, in the prior art, even when a temperature at the time of opening the door is the temperature between the set notch temperature (NT) and the lower limit notch temperature (NT−diff) or lower than the lower limit notch temperature (NT−diff), the efficiency of power consumption may decrease. That is, in the prior art, when the temperature rises by more than 2° C. within 5 minutes, even if the temperature of the storage compartment still satisfies the set notch temperature (NT), the load operation is performed, resulting in decreasing the efficiency of power consumption.

In particular, in the prior art, various situations may occur in which the load operation needs to be released while the load operation is being performed. However, a control for releasing the load operation is not carried out, so it is not possible to respond to other situations until the load operation is completed.

In addition, in the prior art, when the door is repeatedly opened and closed every 5 minutes, the load operation may not be performed. As a result, the temperature of the storage compartment may continue to rise.

DISCLOSURE

Technical Problem

The present disclosure is devised to solve various problems according to the prior arts described above.

An objective of the present disclosure is to improve a start condition and a release condition of a load operation according to an opening of a door. Accordingly, an efficient load operation may be performed and power consumption may be improved.

Another objective of the present disclosure is to determine the release condition of the load operation based on a temperature in a storage compartment when a door is opened, thereby enabling the efficient load operation to be performed.

Another objective of the present disclosure is to determine the start condition of the load operation based on a temperature in the storage compartment when the door is opened, thereby enabling the efficient load operation to be performed.

Another objective of the present disclosure is to ensure that the load operation may be appropriately performed at an accurate time when the temperature in the storage compartment rises rapidly after the door is opened.

Another objective of the present disclosure is to prevent the load operation from not being performed despite the need for the load operation in the process of determining the load operation after the door is opened.

Technical Solution

According to a refrigerator and control method thereof of the present disclosure, a normal storage operation, a load operation, and a release operation of the load operation may be selectively performed.

According to the refrigerator and the control method thereof of the present disclosure, when a temperature of the storage compartment is in a dissatisfaction region, the supply of cold air may be increased.

According to the refrigerator and the control method thereof of the present disclosure, when the temperature of the storage compartment is in a satisfaction region, the supply of cold air may be reduced.

According to the refrigerator and the control method thereof of the present disclosure, when a start condition of the load operation is satisfied when the door is opened, the supply of cold air may be increased compared to the normal storage operation.

According to the refrigerator and the control method thereof of the present disclosure, the release condition of the load operation is satisfied when the door is opened, the load operation is released and switched to (or maintained) the normal storage operation.

According to the refrigerator and the control method thereof of the present disclosure, when the temperature of the storage compartment is in a dissatisfaction region when the door is opened, the load operation may start.

According to the refrigerator and the control method thereof of the present disclosure, the dissatisfaction region may include a case where the temperature of the storage compartment is higher than an upper limit notch temperature (NT+diff) set based on a set notch temperature (NT).

According to the refrigerator and the control method thereof of the present disclosure, when the temperature in the storage compartment rises to exceed an input temperature range ($\Delta T$) of the load operation from the time the door is opened, the load operation may start.

According to the refrigerator and the control method thereof of the present disclosure, the input temperature range ($\Delta T$) may be set to a temperature in a different range depending on the temperature of the storage compartment at the time the door is opened.

According to the refrigerator and the control method thereof of the present disclosure, the input temperature range ($\Delta T$) may be set to be shorter when the temperature of the storage compartment is high at the time the door is opened than when the temperature of the storage compartment is low at the time the door is opened.

According to the refrigerator and the control method thereof of the present disclosure, the input temperature range ($\Delta T$) may be set to be different when the temperature of the storage compartment is higher than the upper limit notch temperature (NT+diff) at the time the door is opened and when the temperature is lower than the upper limit notch temperature (NT+diff).

According to the refrigerator and the control method thereof of the present disclosure, the input temperature range ($\Delta T$) may be set to be shorter when the temperature of the storage compartment is higher than the upper limit notch temperature (NT+diff) at the time the door is opened than when the temperature of the storage compartment is lower than the upper limit notch temperature (NT+diff) at the time the door is opened.

According to the refrigerator and the control method thereof of the present disclosure, the input temperature range ($\Delta T$) may be set to be longer when the temperature of the storage compartment is lower than the upper limit notch temperature (NT+diff) at the time the door is opened than when the temperature of the storage compartment is higher than the upper limit notch temperature (NT+diff) at the time the door is opened.

According to the refrigerator and the control method thereof of the present disclosure, the operation start condition may include a case where the temperature in the storage compartment exceeds the input temperature range ($\Delta T$) from the dissatisfaction region out of the upper limit notch temperature (NT+diff) after the open door is closed.

According to the refrigerator and the control method thereof of the present disclosure, when the temperature in the storage compartment is in the satisfaction region when the door is opened, the load operation may be released and switched to the normal storage operation or the normal storage operation being performed may be maintained.

According to the refrigerator and the control method thereof of the present disclosure, the satisfaction region of the temperature of the storage compartment in which the load operation is released may include a case where the temperature of the storage compartment is lower than the upper limit notch temperature (NT+diff).

According to the refrigerator and the control method thereof of the present disclosure, the satisfaction region of the temperature of the storage compartment in which the load operation is released may include a case where the temperature of the storage compartment is lower than the set notch temperature (NT).

According to the refrigerator and the control method thereof of the present disclosure, the satisfaction region of the temperature of the storage compartment in which the load operation is released may include a case where the temperature of the storage compartment is lower than a lower limit notch temperature (NT−diff).

According to the refrigerator and the control method thereof of the present disclosure, the satisfaction region of the temperature of the storage compartment in which the load operation is released may include a first satisfaction region having a lower temperature range than the dissatisfaction region.

According to the refrigerator and the control method thereof of the present disclosure, the first satisfaction region may include a case where the temperature of the storage compartment is lower than the lower limit notch temperature (NT−diff).

According to the refrigerator and the control method thereof of the present disclosure, the satisfaction region of the temperature of the storage compartment in which the load operation is released may include a second satisfaction region having a lower temperature range than the first satisfaction region.

According to the refrigerator and the control method thereof of the present disclosure, the second satisfaction region may include a case where the temperature of the storage compartment is between the upper limit notch temperature (NT+diff) and the lower limit notch temperature (NT−diff).

According to the refrigerator and the control method thereof of the present disclosure, it is possible to control the load operation to vary depending on at least one of the temperatures of the storage compartment and whether the normal storage operation for the storage compartment is being performed.

According to the refrigerator and the control method thereof of the present disclosure, when a temperature outside the refrigerator is higher than a set temperature, it may be determined that the start condition of the load operation is satisfied.

According to the refrigerator and the control method thereof of the present disclosure, when a temperature outside the refrigerator is lower than the set temperature, it may be determined that the release condition of the load operation is satisfied.

According to the refrigerator and the control method thereof of the present disclosure, when a return condition of the load operation is satisfied, it may be determined whether the operation start condition of the load operation is satisfied.

According to the refrigerator and the control method thereof of the present disclosure, the return condition of the load operation may include a case where the temperature outside the refrigerator is higher than the set temperature.

According to the refrigerator and the control method thereof of the present disclosure, the return condition of the load operation may include a case where a set time elapses after the door is opened.

According to the refrigerator and the control method thereof of the present disclosure, the return condition of the load operation may include a case where a temperature rise amount per unit time in the storage compartment is equal to or greater than a set value after the open door is closed.

According to the refrigerator and the control method thereof of the present disclosure, when the door is opened while the normal storage operation is being performed, the normal storage operation may be maintained or the load operation may be switched to the normal storage operation if the operation release condition is satisfied.

According to the refrigerator and the control method thereof of the present disclosure, when the temperature of the storage compartment from the time of opening the door belongs to the dissatisfaction region, it may be determined that the operation start condition of the load operation is satisfied.

According to the refrigerator and the control method thereof of the present disclosure, when the door is opened and the temperature of the storage compartment is in the satisfaction region, the temperature rise amount for starting the load operation may be set to $\Delta T1$.

According to the refrigerator and the control method thereof of the present disclosure, when a condition for an elapsed time from the opening of the door is satisfied and the temperature rises above $\Delta T1$, the load operation may start.

According to the refrigerator and the control method thereof of the present disclosure, when the temperature of the storage compartment is in the dissatisfaction region, higher than NT+diff at the time the door is opened, the temperature rise amount for starting the load operation may be set to $\Delta 2$.

According to the refrigerator and the control method thereof of the present disclosure, when the condition for the elapsed time from the opening of the door is satisfied and the temperature rises above $\Delta T2$, the load operation may be started.

According to the refrigerator and the control method thereof of the present disclosure, $\Delta T2$ may be set lower than $\Delta T1$.

According to the refrigerator and the control method thereof of the present disclosure, the satisfaction region may be a temperature in the range between the upper limit notch temperature (NT+diff) and the lower limit notch temperature (NT−diff).

According to the refrigerator and the control method thereof of the present disclosure, the dissatisfaction region may be a temperature between the upper limit notch temperature (NT+diff) and a preset upper limit temperature.

According to the refrigerator and the control method thereof of the present disclosure, a reference time for determining the temperature rise amount in the refrigerator may be set longer than a time taken from the opening of the door to the closing of the door.

According to the refrigerator and the control method thereof of the present disclosure, if the condition for the elapsed time from the opening of the door is within a set time, whether the operation start condition is satisfied may be periodically performed within the set time.

According to the refrigerator and the control method thereof of the present disclosure, if the elapsed time from the opening of the door is after the set time is elapsed, whether the operation start condition is satisfied may be performed after the set time is elapsed.

According to the refrigerator and the control method thereof of the present disclosure, the input temperature range ($\Delta T$) may satisfy the condition of '0<$\Delta T1 \leq$ the upper limit temperature−upper limit notch temperature (NT+diff).

According to the refrigerator and the control method thereof of the present disclosure, when the temperature of the storage compartment is the upper limit notch temperature (NT+diff) after the door is opened, a process of counting the elapsed time may be included.

According to the refrigerator and the control method thereof of the present disclosure, when the temperature of the storage compartment is the upper limit notch temperature (NT+diff) after the door is opened, it may be determined that the start condition is satisfied when the counted elapsed time reaches a first reference time.

According to the refrigerator and the control method thereof of the present disclosure, the first reference time may be longer than a time set as a condition for the elapsed time from the opening time of the door.

According to the refrigerator and the control method thereof of the present disclosure, after the door is opened, if the temperature of the storage compartment≥(NT+diff+upper limit temperature)/2 is satisfied, the first reference time may be reset to a second reference time.

According to the refrigerator and the control method thereof of the present disclosure, the second reference time may be shorter than the first reference time.

According to the refrigerator and the control method thereof of the present disclosure, after the door is opened, if the temperature in the storage compartment is the upper limit notch temperature (NT+diff), the elapsed time may be counted and the temperature change amount ($\Delta T$) per unit time may be measured during the counted time.

According to the refrigerator and the control method thereof of the present disclosure, when the temperature change amount (ΔT)>1 and the counted elapsed time reaches a third reference time, the load operation may be performed.

According to the refrigerator and the control method thereof of the present disclosure, when the temperature change amount (ΔT)<1 and the counted elapsed time reaches a fourth reference time, the load operation may be performed.

According to the refrigerator and the control method thereof of the present disclosure, the fourth reference time may be longer than the third reference time.

According to the refrigerator and the control method thereof of the present disclosure, the fourth reference time may be the same time as the time set as a condition for the elapsed time from the opening time of the door.

According to the refrigerator and the control method thereof of the present disclosure, if it is determined that the start condition of the load operation is not satisfied, the load operation may be controlled not to be performed.

According to the refrigerator and the control method thereof of the present disclosure, if it is determined that the start condition of the load operation is not satisfied, a condition determination step may be performed again after a certain period of time is elapsed.

According to the refrigerator and the control method thereof of the present disclosure, the condition determination step performed again may be limited to any set number of times.

According to the refrigerator and the control method thereof of the present disclosure, if it is confirmed that the temperature decreases during the performance of the condition determination step, the additional condition determination step may be controlled not to be performed again.

Advantageous Effect

As described above, in the refrigerator and the control method thereof of the present disclosure, the power consumption is reduced because a load operation is performed when an operation start condition is satisfied.

In addition, in the refrigerator and the control method thereof of the present disclosure, when a temperature of the storage compartment at the time of the door opening is the temperature of dissatisfaction region, it may be determined that an operation start condition is satisfied regardless of an input temperature range. This keeps the food stored in the storage compartment fresh.

In addition, in the refrigerator and the control method thereof of the present disclosure, power consumption is reduced as the load operation is performed when the operation start condition is satisfied.

In addition, in the refrigerator and the control method thereof of the present disclosure, it may be configured to set different input temperature range (ΔT 1, ΔT 2) depending on the temperature of the storage compartment when the door is opened. Thus, it is possible to simultaneously consider power consumption and deterioration of stored food.

In addition, in the refrigerator and the control method thereof of the present disclosure, whether to input the load operation may be determined by using a measured temperature change amount per unit time. Thereby, concerns about the deterioration of the stored food, which may be caused by a sudden temperature change, are prevented.

In addition, in the refrigerator and the control method thereof of the present disclosure, the execution time of the load operation may be controlled differently depending on the temperature of the storage compartment after the door is opened. Accordingly, it is possible to determine the operation start condition by using an accurate temperature sensing value.

In addition, in the refrigerator and the control method thereof the present disclosure, depending on the temperature change amount per unit time, an elapsed time from the time of closing the door to the input of the load operation may be set differently. Accordingly, is possible to simultaneously consider power consumption and concern about deterioration of stored food.

In addition, in the refrigerator and the control method thereof of the present disclosure, when a release condition of the load operation is satisfied when the door is opened, the load operation is released and switched to the normal storage operation or the normal storage operation being performed may be maintained. This reduces power consumption.

DESCRIPTION OF DRAWINGS

FIG. 1 is a state diagram illustrating an internal structure of a refrigerator according to an embodiment of the present disclosure.

FIG. 2 is a block diagram schematically illustrating a structure for a load operation of the refrigerator according to an embodiment of the present disclosure.

FIG. 3 is a state diagram schematically showing the structure of a thermoelectric module according to an embodiment of the present disclosure.

FIG. 4 is a block diagram schematically showing a refrigeration cycle of the refrigerator according to an embodiment of the present disclosure.

FIG. 5 is a view schematically showing an operation state performed according to an operation base value based on a user-set notch temperature for a storage compartment of the refrigerator according to an embodiment of the present disclosure.

FIGS. 6 and 7 are flowcharts illustrating a control process of the refrigerator according to a first embodiment of the present disclosure.

FIGS. 8 and 9 are flowcharts illustrating a control method of the refrigerator according to a second embodiment of the present disclosure.

FIG. 10 is a graph illustrating a state in which a door is opened in a satisfaction region in the control method of the refrigerator according to the second embodiment of the present disclosure.

FIG. 11 is a graph illustrating a state in which a door is opened in a dissatisfaction region in the control method of the refrigerator according to the second embodiment of the present disclosure.

FIGS. 12 and 13 are flowcharts illustrating the control method of the refrigerator according to a third embodiment of the present disclosure.

FIGS. 14 and 15 are flowcharts illustrating the control method of the refrigerator according to a fourth embodiment of the present disclosure.

FIGS. 16 and 17 are flowcharts illustrating the control method of the refrigerator according to a fifth embodiment of the present disclosure.

BEST MODE

The present disclosure allows a start of a load operation or a release of a load operation depending on a temperature of a storage compartment at a time when a door is opened, so that the operation that reduces power consumption may be performed.

In the present disclosure, it is determined whether the load operation starts based on a range of the temperature of the storage compartment, after first confirming the range of the temperature of the storage compartment at the time of opening the door. Accordingly, a more accurate and efficient load operation may be performed than when the load operation starts based on the changed temperature up to a predetermined time after the door is opened.

Preferred embodiments of the refrigerator and the control method thereof according to the present disclosure will be described with reference to FIGS. 1 to 17.

FIG. 1 is a state diagram illustrating an internal structure of the refrigerator according to an embodiment of the present disclosure, and FIG. 2 is a block diagram schematically illustrating a structure for load operation and release operation of the refrigerator according to an embodiment of the present disclosure.

As illustrated in these drawings, the refrigerator according to an embodiment of the present disclosure includes a casing 11.

The above casing 11 includes an inner-casing 11a forming an interior wall of the refrigerator 1 and an outer casing 11b forming an exterior, and a storage compartment in which a stored material is stored is provided by the casing 11.

Only one storage compartment may be provided or two or more storage compartments may be provided. In an embodiment of the present disclosure, for example, two storage compartments for storing stored materials in different temperature regions are included.

The storage e compartment may include a first storage compartment 12 maintained at a first set notch temperature (NT).

The first set notch temperature (NT) may indicate a temperature range where the storage is not frozen, but it may be in a lower than a temperature (room temperature) outside the refrigerator 1.

For example, the first set notch temperature (NT) may be set to a temperature of the storage compartment of less than or equal to 32° C. and greater than 0° C. Of course, the first set notch temperature (NT) may be set higher than 32° C., or equal to or lower than 0° C., if necessary (e.g., depending on the indoor temperature or the type of storage).

In particular, the first set notch temperature (NT) may be the temperature of the first storage compartment 12 set by a user, and if the user does not set the first set notch temperature (NT), an arbitrarily specified temperature is used as the first set notch temperature (NT).

In addition, the first storage compartment 12 is subjected to a normal storage operation at a first operation base value (NT±diff) to maintain the first set notch temperature (NT).

The first operation base value (NT±diff) is a temperature range value of a satisfaction region including a first lower limit notch temperature (NT−diff) and a first upper limit notch temperature (NT+diff).

That is, when the temperature of the first storage compartment 12 reaches the first lower limit notch temperature (NT−diff1) based on the first set notch temperature (NT), the operation for supplying cold air is stopped. On the other hand, when the temperature of the storage compartment rises based on the first set notch temperature (NT), the operation for supplying cold air resumes before reaching the first upper limit notch temperature (NT+diff).

As such, in the first storage compartment 12, cold air is supplied or stopped in consideration of the first operation base value (NT+diff) of the first storage compartment 12 based on the first set notch temperature (NT) and thus the normal storage operation is performed.

The first set notch temperature (NT) and the first operation base value (NT+diff) are as shown in FIG. 3.

In addition, the storage compartment may include a second storage compartment 13 maintained at a second set notch temperature (NT2).

The second set notch temperature (NT2) may be lower than the first set notch temperature (NT). In this case, the second set notch temperature (NT2) may be set by the user, and when the user does not set it, a predetermined specified temperature is used.

The second set notch temperature (NT2) may be a temperature sufficient to freeze the storage. For example, the second set notch temperature (NT2) may be set to a temperature of equal to or lower than 0° C. or equal to or higher than −24° C.

Of course, the second set notch temperature (NT2) may be set higher than 0° C., or equal to or lower than −24° C., as necessary (e.g., depending on the room temperature or type of storage).

In particular, the second set notch temperature (NT2) may be the temperature of the second storage compartment 13 set by the user, and if the user does not set the second set notch temperature (NT2), a predetermined specified temperature may be used as the second set notch temperature (NT2).

In addition, the second storage compartment 13 may be operated at a second operation base value (NT2±diff2) to maintain the second set notch temperature (NT2).

The second operation base value (NT2±diff2) is a temperature range value of a satisfaction region including a second lower limit notch temperature (NT2−diff2) and a second upper limit notch temperature (NT2+diff2).

That is, when the temperature of the second storage compartment 13 reaches the second lower limit notch temperature (NT2−diff2) based on the second set notch temperature (NT2), the operation for supplying cold air may be stopped. On the other hand, when the temperature of the storage compartment rises based on the second set notch temperature (NT2), the operation for supplying cold air resumes before reaching the second upper limit notch temperature (NT2+diff2).

As such, in the second storage compartment 13, cold air is supplied or stopped in consideration of the second operation base value (NT2±diff2) for the second storage compartment 13 based on the second set notch temperature (NT2).

In particular, the first operation base value (NT+diff) may be set to have a smaller range between the upper limit notch temperature (NT+diff) and the lower limit notch temperature (NT−diff) than the second operation base value (NT2±diff2).

For example, the first lower limit notch temperature (NT−diff) and the first upper limit notch temperature (NT+diff) of the first operation base value (NT+diff) may be set to ±2.0° C., and the second lower limit notch temperature (NT2−diff2) and the second upper limit notch temperature (NT2+diff2) of the second operation base value (NT2±diff2) may be set to +1.5° C.

Meanwhile, each of the above-described storage compartments 12 and 13 is configured such that the temperature of the storage compartment is maintained while a fluid is circulated.

The fluid may be air. In the following description, an example is that the fluid circulating through the storage compartments 12 and 13 is air. Of course, the fluid may be a gas other than air.

The external temperature outside the storage compartments 12 and 13 (indoor temperature) may be measured by a first temperature sensor 1a, and the internal temperature of the first storage compartment may be measured by a second temperature sensor 1b (see FIG. 9 attached).

The first temperature sensor 1a and the second temperature sensor 1b may be performed separately. Of course, the indoor temperature and the internal temperature may be measured by a single temperature sensor, or may be configured to be measured by two or more temperature sensors cooperatively.

In addition, doors 12a and 13a are provided in the storage compartments 12 and 13.

The doors 12a, 13a serve to open and close the storage compartments 12, 13, and may be configured as a rotary opening/closing structure or a drawer type opening/closing structure.

The doors 12a and 13a may be provided in one or more plurality.

In particular, at least any one of the doors 12a and 13a or the casing 11 may be provided with a detection sensor 14 capable of detecting whether the doors 12a and 13a are opened.

Next, the refrigerator 1 according to an embodiment of the present disclosure includes a cooling source.

The cooling source is configured to generate cold air.

Such a cooling source may be configured in various ways.

For example, the cooling source may be composed of a thermoelectric module 23.

In this case, the thermoelectric module 23 may include a thermoelectric element 23a including a heat absorbing surface 231 and a heat generating surface 232, and a sink 23b connected to at least one of the heat absorbing surface 231 and the heat generating surface 232, as shown in FIG. 3.

In the embodiment of the present disclosure, the structure for generating cold air of the cooling source may be formed of a refrigeration system including evaporators 21 and 22 and a compressor 60.

The evaporators 21 and 22 form the refrigeration system with the compressor 60 (see attached FIG. 4), a condenser (not shown), and an expander (not shown), and operate to lower the temperature of the air while exchanging heat with air passing through the evaporator.

When the storage compartment includes the first storage compartment 12 and the second storage compartment 13, the evaporator may include the first evaporator 21 for supplying cold air to the first storage compartment 12 and the second evaporator 22 for supplying cold air to the second storage compartment 13.

In this case, the first evaporator 21 may be located at a rear side of the first storage compartment 12 in the inner casing 11a, and the second evaporator 22 may be located at a rear side of the second storage compartment 13.

Although not shown, the evaporator may be provided only in at least one of the first storage compartment 12 or the second storage compartment 13.

In addition, even if the two evaporators 21 and 22 are provided, only one compressor 60 constituting the corresponding refrigeration system may be provided.

In this case, as shown in FIG. 4, the compressor 60 may be connected to supply the refrigerant to the first evaporator 21 through a first refrigerant passage 61 and may be connected to supply the refrigerant to the second evaporator 22 through a second refrigerant passage 62. In this case, each of the refrigerant passages 61 and 62 may be selectively opened and closed using a refrigerant valve 63.

In addition, a cooling fan may be included as a structure for supplying the cold air of the cooling source. Such a cooling fan may be configured to serve to supply the cold air generated while passing through the cooling source to the storage compartments 12 and 13.

In this case, the cooling fan may include a first cooling fan 31 that supplies cold air generated while passing through the first evaporator 21 to the first storage compartment 12.

In addition, the cooling fan may include a second cooling fan 41 that supplies cold air generated while passing through the second evaporator 22 to the second storage compartment 13.

Next, the refrigerator 1 according to the embodiment of the present disclosure includes a controller 70. The controller may be a microprocessor, an electrical logic circuit, and the like.

The controller 70 may control to gradually increase or decrease the supply amount of cold air supplied into the first storage compartment 12, or to supply it to the maximum load.

The controller 70 may perform the normal storage operation in which the first storage compartment 12 maintains the first set notch temperature (NT) while controlling the operation of the refrigeration system based on the temperature measured by the first temperature sensor 1a and the second temperature sensor 1b. Of course, the controller 70 may also serve to control the second storage compartment 13 to maintain the second set notch temperature (NT2).

In the normal storage operation, the cold air supply is controlled to decrease when the temperature of the first storage compartment 12 is in the satisfaction region, and the cold air supply is controlled to increase when the temperature of the first storage compartment 12 is in the dissatisfaction region.

Here, referring to FIG. 5, the satisfaction region may be a temperature range between the first upper limit notch temperature (NT+diff) and the first lower limit notch temperature (NT−diff) based d on the first set notch temperature (NT), and the dissatisfaction region may be a higher temperature than the first upper limit notch temperature (NT+diff).

FIG. 5 is a diagram schematically illustrating an operation state performed according to the operation base value based on the user-set notch temperature for the first storage compartment 12 of the refrigerator according to the embodiment of the present disclosure.

The controller 70 may control the refrigeration system to power saving operation in consideration of power consumption during normal storage operation. For example, the temperature of the first storage compartment 12 may be gradually lowered.

The controller 70 may control the operation to prevent deterioration of food during the load operation. For example, the temperature of the first storage compartment 12 is quickly lowered while the refrigeration system operates at high power.

In addition, when the first door 12a is opened and the operation start condition is, the controller 70 may perform the load operation for controlling to increase the supply of cold air compared to the normal storage operation.

During the normal storage operation, the refrigeration system is operated in a power saving operation in consideration of power consumption and the temperature of the first storage compartment 12 is gradually lowered. Meanwhile, during the load operation, the refrigeration system is operated with high power to prevent food deterioration and the temperature of the first storage compartment 12 is controlled to be rapidly lowered.

In addition, the controller 70 may include a counter 71 for counting time.

Meanwhile, since the load operation is operated with high power as described above, power consumption increases as it is frequently performed.

As a solution to this, it is desirable to set the operation start condition so that the load operation is performed only when the start condition is satisfied.

That is, when the start condition of the load operation for the first storage compartment 12 is satisfied, the controller controls the amount of cold air supplied from the cooling source to increase.

The operation start condition is described in more detail as follows.

First, the operation start condition may include an opening condition of the first door 12a (a first operation condition).

The opening condition of the first door 12a may include when the first door 12a is opened or when the first door 12a is opened and closed. That is, when the first door 12a is not opened, it is determined that the operation start condition is not satisfied.

In addition, the operation start condition may include a condition of a set elapsed time (a second operation condition).

The condition of the set elapsed time may be from the opening of the first door 12a until reaching the set elapsed time, or from the closing of the first door 12a until reaching the set elapsed time. That is, it may be set to periodically perform the determination of the operation start condition within the set elapsed time.

To this end, the controller 70 may include a counter 71 for counting time.

In addition, the operation start condition may include a condition (a third operation condition) in which the temperature in the first storage compartment 12 measured after the first door 12a is opened exceeds the input temperature range ($\Delta T$).

The input temperature range ($\Delta T$) may be a specific temperature or a specific temperature range.

Preferably, the input temperature range ($\Delta T$) is a temperature that satisfies the condition of $0<\Delta T \leq a$ set upper limit temperature–the first upper limit notch temperature (NT+diff). At this time, the above set upper limit temperature is the maximum temperature allowed by the first storage compartment 12 of the refrigerator, and may be the notch temperature for determining whether a failure or a complete frosting of the evaporator (first evaporator) 21. That is, the input temperature range ($\Delta T$) is determined so that the temperature of the first storage compartment does not exceed the set upper limit temperature.

In addition, the input temperature range ($\Delta T$) may be different from a case where the temperature measured when the first door 12a is opened is higher than the first upper limit notch temperature (NT+diff) set based on the first set notch temperature (NT) and a case where the temperature is lower than the first upper limit notch temperature (NT+diff).

In addition, the operation start condition may include a case where the temperature of the first storage compartment is greater than or equal to the base value 1 (temperature of the storage compartment≥base value 1) (a fourth operation condition).

Here, the base value 1 is greater than the first upper limit notch temperature (NT+diff) and less than or equal to the set upper limit temperature ((NT+diff)<base value 1≤ set upper limit temperature).

That is, the fourth operation condition is a condition that supplements the second and third operation conditions, and if the first door 12a is opened and the temperature of the storage compartment belongs to the dissatisfaction region (higher than the first upper limit notch temperature (NT+diff)), the load operation is performed regardless of the input temperature range ($\Delta T$) or the elapsed time after the first door 12a is opened.

In addition, the operation start condition may include a case where a base value 2 is less than the input temperature range ($\Delta T$) ($\Delta T$>the base value 2) (a fifth operation condition). In this case, the base value 2 is greater than 0 but smaller than or equal to the difference between the first upper limit notch temperature (NT+diff) from the set upper limit temperature (0<base value 2–the first upper limit notch temperature (NT+diff)). In other words, after the first door 12a is opened, when the input temperature range ($\Delta T$) is set to fall within the temperature between the set upper limit temperature and the first upper limit notch temperature (NT+diff), the load operation is performed regardless of whether the input temperature range ($\Delta T$) is reached.

In addition, the operation start condition may include a case in which the temperature outside the refrigerator (room temperature) is higher than a set temperature.

In this case, the set temperature may be higher than the first upper limit notch temperature (NT+diff).

That is, when the first door 12a is opened in a state where the room temperature is high, the temperature inside of the first storage compartment 12 may be rapidly increased under the influence on the room temperature. Accordingly, it is more desirable to set the operation start condition of the load operation by considering the room temperature and the temperature in the first storage compartment 12 at the same time.

As such, since the load operation is performed only when various operation start conditions are satisfied, overall power consumption may be reduced, and thus power consumption efficiency may be improved.

Meanwhile, as another method for improving power consumption efficiency, the controller 70 may release the load operation when the load operation release condition is satisfied and switch to (or maintain) the normal storage operation.

That is, when the operation release condition is satisfied while the load operation is being performed or the operation is waiting, the load operation is switched so that the normal storage operation may be performed. In this way, power consumption may be reduced.

The release condition of the load operation may include a case where the temperature in the first storage compartment 12 is in the satisfaction region when the first door 12a is opened.

That is, the controller 70 determines that the operation release condition is satisfied when the temperature in the first storage compartment 12 is in the satisfaction region at the time the first door 12a is opened, and controls the load operation to be released and switched into the normal storage operation.

The satisfaction region described above may include: when the temperature of the first storage compartment 12 is lower than the first upper limit notch temperature (NT+diff) set based on the first set notch temperature (NT); when the temperature of the first storage compartment 12 is lower than the set notch temperature (NT); and when the temperature of the first storage compartment 12 is lower than the first lower limit notch temperature (NT–diff) set based on the set notch temperature (NT).

In addition, the satisfaction region may be divided into a first satisfaction region having a lower temperature range than the dissatisfaction region and a second satisfaction region having a lower temperature range than the first satisfaction region.

The first satisfaction region may include a case where the temperature of the first storage compartment 12 is lower than the first lower limit notch temperature (NT−diff) set based on the first set notch temperature (NT).

The second satisfaction region may include a case where the temperature of the first storage compartment 12 is between the first upper limit notch temperature (NT+diff) and the first lower limit notch temperature (NT−diff).

In addition, the operation release condition may include a case where the room temperature (outside the refrigerator) is lower than the set temperature.

That is, when the room temperature is lower than the set temperature, if the first door 12a is opened and the room air is introduced into the first storage compartment 12, the temperature inside the first storage compartment 12 does not rise rapidly. Considering this, when the room temperature is confirmed to be lower than the set temperature when the first door 12a is opened, the controller 70 determines that the release condition of the load operation is satisfied and controls the load operation to be released, if there is no change in the temperature (e.g., rise to the dissatisfaction region).

On the other hand, the controller 70 may control the load operation to be returned when a predetermined condition (return condition) is satisfied, even when the load operation is controlled to be released.

In other words, when the return condition of the load operation is satisfied, it is determined whether the operation start condition for the load operation is satisfied and the load operation is controlled to be performed.

In this case, the return condition may include: a case where the temperature outside the first storage compartment 12 is higher than the set temperature; a case where a set time is elapsed after the first door 12a is opened; and a case where a temperature increase in the first storage compartment 12 per unit time is equal to or greater than a set value. That is, the return condition may be a condition provided to accurately determine that the load operation is actually required.

Next, the control process of the first embodiment of the normal storage operation, the load operation and the release operation of the refrigerator according to the present disclosure will be described in more detail with reference to the flowcharts of FIGS. 6 and 7.

Prior to the description, each operation (normal storage operation, load operation, release operation) is performed under the control of the controller 70 that operates the refrigeration system by receiving the sensing values of each temperature sensor (1a, 1b). In the following first embodiment, each operation is for the first storage compartment 12.

First, according to the control process of the first embodiment, the controller 70 continuously acquires sensing values for the room temperature outside the refrigerator and the internal temperature of the first storage compartment 12 at S110. The internal temperature is measured by the second temperature sensor 1b located in the first storage compartment 12, and the measured internal temperature is provided to the controller 70.

The controller 70 performs the normal storage operation for the first storage compartment 12 while controlling the refrigeration system based on the acquired internal temperature at S120.

The above normal storage operation is performed to maintain the temperature range of the satisfaction region (temperature range between the first upper limit notch temperature (NT+diff) and the first lower limit notch temperature (NT−diff) based on the first set notch temperature (NT).

The compressor 60 constituting the refrigeration system during the normal storage operation is controlled to operate at a lower output than the load operation. That is, during the load operation, the compressor 60 is operated with a higher output, thereby rapidly stabilizing the temperature of the first storage compartment 12.

In the normal storage operation, when the first upper limit notch temperature (NT1+diff) is reached, the compressor 60 is operated to increase the cold air supply. Before the first lower limit notch temperature (NT1−diff) is reached, the operation of the compressor 60 is stopped to reduce the supply of cold air. While repeating this control, the temperature of the first storage compartment is stabilized. Of course, the compressor 60 may be controlled to operate before reaching the first upper limit notch temperature (NT1+diff), or may be controlled to operate the when reaching dissatisfaction region exceeding the first upper limit notch temperature (NT1+diff).

In addition, while the normal storage operation described above is being performed, the controller 70 continuously determines whether the operation start condition of the responsive operation is satisfied based on the temperature information inside the first storage compartment 12.

The operation start condition is preceded by a condition in which the first door 12a is opened. That is, only when the first door 12a for opening and closing the first storage compartment 12 is opened, the determination of the start condition of the load operation is made. When the first door 12a is not opened, the normal storage operation is repeatedly performed.

When it is confirmed that the first door 12a is opened during the normal storage operation, the controller 70 receives a temperature value for the temperature of the first storage compartment from the second temperature sensor 1b at S130. In this case, the temperature value for the temperature of the storage compartment may be continuously provided within the set elapsed time after the first door 12a is opened, or may be provided after the set elapsed time.

Continuously, the controller 70 checks whether the received temperature of the storage compartment is in the satisfaction region or dissatisfaction region set based on the first set notch temperature (NT).

As a result of this check, if it is confirmed that the temperature of the storage compartment belongs to the dissatisfaction region (the region outside the first upper limit notch temperature (NT+diff)), it is determined that the operation start condition is satisfied regardless of the input temperature range ΔT or the elapsed time from the opening of the first door 12a at S140.

On the other hand, if it is confirmed that the temperature of the storage compartment belongs to the satisfaction region (the region within the first upper limit notch temperature (NT+diff)), the counter 71 checks the counted elapsed time after the first door 12a is opened.

Then, while the elapsed time is being counted, or when the counted time elapses, the rise range of the temperature of the storage compartment is checked to determine whether the rise range is equal to or greater than the preset input temperature range (ΔT).

That is, if the rise range of the storage temperature is greater than or equal to the input temperature range (ΔT), it is determined that the operation start condition is satisfied. If the rise range of the temperature of the storage compartment is smaller than the input temperature range (ΔT), it is determined the operation start condition is not satisfied.

For example, if the temperature rise in the storage compartment exceeds 2° C. (input temperature range) when 5 minutes (elapsed time) elapse after the opening of the first door 12a, it is determined that the operation start condition is satisfied, and if it does not exceed 2° C., the operation start condition is not satisfied.

If it is determined that the operation start condition is satisfied (when the temperature of the storage compartment is within the dissatisfaction region, or when the temperature rise in the storage compartment is greater than or equal to the input temperature range (ΔT) even in the satisfaction region), the controller 70 controls the load operation to be performed at S150 according to the result of this determination.

The load operation may be performed in a state in which the first door 12a is closed. That is, if it is determined that the operation start condition for the load operation is satisfied before the first door 12a is closed, the load operation may be performed immediately after the first door 12a is closed. If it is determined that the operation start condition for the load operation is satisfied after the first door 12a is closed, the load operation may be performed immediately after the determination of the satisfaction is made.

If it is confirmed that the operation start condition of the load operation is not satisfied, the controller 70 determines that the operation release condition is satisfied at S171. Thereafter, the controller 70 controls the load operation to be released at S172, and then switched to the normal storage operation (or maintained) at S173. This is the same as the flowchart of FIG. 7 attached.

The release of the load operation at S172 may be controlled so that the load operation is not performed and the normal storage operation is performed unless the first door 12a is opened again. That is, if the operation start condition is not satisfied, the controller 70 controls the normal storage operation based on the first set notch temperature (NT), the first upper limit notch temperature (NT+diff), and the first lower limit notch temperature (NT−diff) according to the temperature of the storage compartment.

Meanwhile, although not shown, when the load operation is released at S172 due to dissatisfaction of the operation start conditions, the determination of whether the operation start condition is satisfied may be performed again if a certain condition is satisfied. In this case, the above certain condition is the return condition of the load operation and may include any one of the following cases: when the operation start condition is satisfied; when the outside temperature of the first storage compartment 12 is higher than the set temperature; when the set time elapses after the first door 12a is opened; and when the temperature rise in the storage compartment per unit is higher than the set value.

When the above-described return condition is satisfied, the controller 70 may control the load operation to be performed.

When it is confirmed that the temperature of the storage compartment is decreased even though the determination of the load operation is performed again, additional determination is not performed. This is because the opening time of the first door 12a is extremely short and the storage compartment is not affected by the room temperature. Of course, even in the case where a heat is not provided in the first storage compartment 12 and cold air is supplied normally by the normal storage operation in the first storage compartment 12, the temperature of the first storage compartment decreases. In this case the determination of the load operation is not performed again.

As such, the operation start condition of the first embodiment by the controller 70 and the control method by using the same may prevent problems such as deterioration of fresh food that may be caused when the operation start condition is determined only by the temperature rise range.

That is, after opening the first door 12a, when the temperature of the first storage compartment 12 rises and belongs to the dissatisfaction region (the region outside the first upper limit notch temperature (NT+diff)), the load operation is performed, thereby solving the problem of not performing the load operation even in the high temperature range.

Meanwhile, the control of the refrigerator of the present disclosure may be implemented by various methods as well as the control method of the first embodiment described above.

Hereinafter, a control method according to another embodiment will be described, respectively.

First, the control process of the refrigerator according to the control method of a second embodiment will be described in more detail with reference to the flowchart of FIG. 8 and the graphs of FIGS. 10 and 11.

The control process according of the second embodiment includes continuously checking and acquiring the temperature of the storage compartment at S210 and performing the normal storage operation at S220 for the first storage compartment 12 while controlling the refrigeration system based on the acquired the temperature of the storage compartment.

Through this, the first storage compartment 12 maintains a temperature range of the satisfaction region (a temperature range between the first upper limit notch temperature (NT+diff) and the first lower limit notch temperature (NT−diff) based on the first set notch temperature (NT).

In addition, while the above-described normal storage operation is being performed, the controller 70 continuously determines whether the operation start condition of the load operation is satisfied based on the information on the temperature in the first storage compartment 12.

Such an operation start condition is preceded by a condition in which the first door 12a is opened. That is, the determination of the load operation is made only when the first door 12a opening and closing the first storage compartment 12 is opened. When the first door 12a is not opened, the normal storage operation is repeatedly performed.

In addition, when it is confirmed that the first door 12a is opened during the normal storage operation, the controller 70 receives a temperature value for the temperature of the storage compartment from the second temperature sensor 1b.

Subsequently, the controller 70 checks whether the received temperature of the storage compartment is the satisfaction region or dissatisfaction region, and determines the input temperature range (ΔT) based on this.

That is, the control method according to the second embodiment of the present disclosure may include a process of determining different input temperature ranges (ΔT) according to the temperature of the storage compartment.

In the case of the prior art, it is determined whether the operation start condition is satisfied based on the same input temperature range (temperature rise width) regardless of the temperature of the first storage compartment 12 at the time the door 12a is opened. On the other hand, in the present disclosure, the input temperature range (ΔT) is set to different ranges depending on the temperature of the first storage compartment 12 at the time the door 12a is opened.

The input temperature range (ΔT) may be different from a case where the temperature of the storage compartment 12 at the time of the door 12a is opened is higher than the upper limit notch temperature (NT+diff) (in case of the dissatisfaction region) set based on the set notch temperature (NT) and a case where the temperature is lower than the upper limit notch temperature (NT+diff) (in case of the satisfaction region).

That is, when the temperature of the storage compartment is in the dissatisfaction region, it is determined as a first input temperature range (ΔT 1), and when the temperature of the storage compartment is in the satisfaction region, it is determined as a second input temperature range (ΔT 2).

In particular, the two input temperature ranges (ΔT1, ΔT2) may be set to a lower temperature (or a temperature range) when the temperature of the first storage compartment 12 is high at the time the door 12a is opened than when the temperature of the first storage compartment 12 is low at the time the door 12a is opened.

That is, the first input temperature range (ΔT 1) in which the temperature of the first storage compartment 12 at the time the door 12a is opened is higher than the first upper limit notch temperature (NT+diff) set based on the first set notch temperature (NT) may be set to a temperature (or temperature range) lower than the second input temperature range (ΔT 2) in which the temperature of the storage compartment is lower than the first upper limit notch temperature (NT+diff).

Of course, the second input temperature range (ΔT2) in which the temperature of the first storage compartment 12 at the time the door 12a is opened is lower than the first upper limit notch temperature (NT+diff) set based on the first set notch temperature (NT) may be set to a temperature (or temperature range) higher than the first input temperature range (ΔT1) in which the temperature of the storage compartment is higher than the first upper limit notch temperature (NT+diff).

In addition, when each input temperature range (ΔT 1, ΔT 2) is determined by the above process, an elapsed time from the opening of the door 12a is counted by using the counter 71.

In this case, the elapsed time may be set to a time sufficient to accurately recognize the temperature rise and obtain an effective value from the recognized temperature rise. It may be generally 5 minutes.

In addition, when the set elapsed time elapses, the controller 70 receives the temperature at the time point of the first storage compartment 12 from the second temperature sensor 1b again.

Thereafter, if it is confirmed that the received temperature of the storage compartment rises above the input temperature range (ΔT 1 or ΔT 2), it is determined that the operation start condition of the load operation is satisfied.

As shown in FIG. 9, when the door 12a is opened, if the temperature of the storage compartment is in the dissatisfaction region and rises by more than ΔT1 set as the input temperature range, it is determined that the start condition of the load operation is satisfied. As shown in FIG. 10 when the door 12a is opened, if the temperature of the storage compartment is in the satisfaction region and rises by more than ΔT2 set as the input temperature range, it is determined that the start condition of the load operation is satisfied.

In this case, the determination of the above operation start condition may be performed periodically within the set elapsed time from the opening time of the door 12a, or may be performed after the set elapsed time from the opening time of the door 12a.

In addition, the load operation is performed according to the determination result of whether the operation start condition is satisfied at S250.

As an example, if a first set notch temperature (NT) is 13° C. and a first upper limit notch temperature (NT+diff) is 23° C., when the temperature of the first storage compartment 12 is 20° C. at the time the door 12a is opened, an input temperature range (ΔT2) may be set to 4° C. When the temperature of the first storage compartment 12 is 25° C. at the time the door 12a is opened, an input temperature range (ΔT1) may be set to 2° C.

That is, if the temperature of the first storage compartment 12 is 20° C. at the time the door 12a is opened, the temperature of the first storage compartment 12 reaches 24° C. within the set elapsed time condition (e.g., 5 minutes), the load operation is performed. If the temperature of the first storage compartment 12 is 25° C. at the time the door 12a is opened, the temperature of the first storage compartment 12 reaches 27° C. within the set elapsed time condition (e.g., 5 minutes), the load operation is performed.

The load operation may be performed in a state in which the first door 12a is closed. That is, if it is determined that the start condition for the load operation is satisfied before the first door 12a is closed, the load operation is performed immediately after the first door 12a is closed. If it is determined that the start condition for the load operation is satisfied after the first door 12a is closed, the load operation is performed immediately after the determination is made.

As shown in the flowchart of FIG. 9, if it is confirmed that the start condition of the load operation is not satisfied, the controller 70 determines that the operation release condition is satisfied at S271. Thereafter, the controller 70 controls the load operation to be released at S272 and switched to the normal storage operation (or maintained the normal storage operation) at S273.

That is, when the load operation is released, the controller 70 controls the normal storage operation to be performed based on the first set notch temperature (NT), the first upper limit notch temperature (NT+diff), and the first lower limit notch temperature (NT−diff) according to the temperature of the storage compartment.

In this way, the operation start condition and control method of the second embodiment according to the present disclosure may solve problems such as deterioration of stored food (e.g., fresh food) that may occur when the operation start condition is determined only by the specified temperature rise range.

Next, the control method according to a third embodiment of the present disclosure will be described in more detail with reference to the flowchart of FIG. 12 attached.

The control method S3 of the third embodiment may include checking the temperature in the storage compartment at S310, performing the normal storage operation according to the temperature of the storage compartment at S320, and checking the temperature of the storage compartment at S330 when the door is opened during the normal storage operation.

The operation start condition according to the control method of the third embodiment may include a case when the temperature change amount (temperature gradient) per unit time is greater than the base value 3 (temperature change amount>base value 3). In this case, the base value 3 may be a value greater than 1.

That is, while counting the elapsed time after the first door 12a is opened, the amount of temperature change (temperature gradient) is measured. As a result, if the temperature change amount per unit time is greater than the base value 3, it is determined that the operation start condition is satisfied at S340 by recognizing that the temperature of the storage compartment rises rapidly. Thereafter, when the set time elapses after the time counting at S350, the load operation is performed at S360.

As shown in the flowchart of FIG. 13, if it is confirmed that the start condition of the load operation is not satisfied in the third embodiment, the controller 70 determines that the operation release condition is satisfied at S371. Thereafter, the controller 70 controls the load operation to be released at S372, and then switched to the normal storage operation (or maintained the normal storage operation) at S373.

That is, when the load operation is released, the controller 70 controls the normal storage operation to be performed based on the first set notch temperature (NT), the first upper limit notch temperature (NT+diff), and the first lower limit notch temperature (NT−diff) according to the temperature of the storage compartment.

Next, the control method according to a fourth embodiment of the present disclosure will be described in more detail with reference to the flowchart of FIG. 14 attached.

The control method S4 of the fourth embodiment may include checking the temperature of the storage compartment at S410 while performing the normal storage operation according to the temperature inside the refrigerator at S420, and checking the temperature of the storage compartment at S430 when the door is opened during the normal storage operation.

The operation start condition according to the control method S4 of the fourth embodiment may include a case where it is confirmed that the temperature of the storage compartment exceeds the first upper limit notch temperature (NT+diff) after the first door 12a is opened at S440, and a case where the first reference time is reached by counting the elapsed time after the door 12a is closed at S450.

That is, considering that the stored food and the cold air in the first storage compartment 12 are gradually heat exchanged, the load operation is started after stabilization of the sensed value so that the end time of the load operation may be accurately determined.

In particular, if the temperature of the storage compartment≥(NT+diff+set upper limit temperature)/2 is satisfied after the door 12a is opened, the counted elapsed time is reset to a second reference time. In addition, when the counted elapsed time reaches the second reference time, the operation start condition may be set to perform the load operation. In this case, the second reference time may be shorter than the first reference time.

That is, the temperature of the storage compartment is higher when the temperature is ≥ (NT+diff+upper limit temperature)/2 than when the temperature is <(NT+diff+upper limit temperature)/2, so the load operation may be put into operation after counting for a shorter time.

As shown in the flowchart of FIG. 15, if it is confirmed that the operation start condition is not satisfied in the fourth embodiment, the controller 70 determines that the operation release condition is satisfied at S471. Thereafter, the controller 70 controls the load operation to be released at S472, and then switched to the normal storage operation (or maintained) at S473.

That is, when the load operation is released, the controller 70 controls the normal storage operation to be performed based on the first set notch temperature (NT), the first upper limit notch temperature (NT+diff), and the first lower limit notch temperature (NT−diff) according to the temperature of the storage compartment.

Next, the control method according to a fifth embodiment of the present disclosure will be described in more detail with reference to the flowchart of FIG. 16 attached.

The control method S5 of the fifth embodiment may include: a process of checking the temperature of the storage compartment at S510 and performing a storage operation according to the temperature of the storage compartment S520; and a process of checking the temperature at S530 when the door is opened during the storage operation.

In addition, the operation start condition according to the control method of the fifth embodiment may include a condition of reaching a different set elapsed time from when the door 12a is closed until the load operation is input according to the amount of temperature change per unit time.

That is, when the temperature of the storage compartment is higher than the upper limit notch temperature (NT+diff), the temperature change per unit time is measured at S540 while counting the elapsed time. If the temperature change is greater than the base value 3 and the counted time elapses the first set time, the load operation is input at S560.

If the amount of temperature change is smaller than the base value 3 and the counted time elapses the second set time, the load operation is input at S570.

The second set time is set to a longer than the first set time.

The method for inputting the load operation when the first set time elapses is an algorithm that considers the constant temperature operation for the freshness (or deterioration) of the stored food. The method for inputting the load operation when the second set time elapses is an algorithm that considers power consumption.

As shown in the flowchart of FIG. 17, if it is confirmed that the operation start condition of the load operation is not satisfied in the fifth embodiment, the controller 70 determines that the operation release condition is satisfied at S571. Thereafter, the controller 70 controls the load operation to be released at S572, and then switched to the normal storage operation (or maintained) at S573.

That is, when the responsive operation is released, the controller 70 controls the normal storage operation to be performed based on the first set notch temperature (NT), the first upper limit notch temperature (NT+diff), and the first lower limit notch temperature (NT−diff) according to the temperature of the storage compartment.

As described above, the refrigerator and control method thereof of the present disclosure may reduce power consumption by allowing the load operation to be performed when the operation start condition is satisfied.

In particular, in the refrigerator and control method thereof of the present disclosure, when the temperature of the storage compartment at the time the first door 12a is opened is the temperature of the dissatisfaction region, it is determined to satisfy the start condition of the load operation regardless of the input temperature range (ΔT). For this reason, it is possible to keep the food stored in the storage compartment 12 fresh.

In addition, in the refrigerator and control method thereof of the present disclosure, when the temperature of the storage compartment at the time the first door 12a is opened is the temperature of the dissatisfaction region, it is determined that the operation start condition is satisfied regardless of the input temperature range (ΔT). For this reason, it is possible to maintain the freshness of the food stored in the storage compartment 12 as much as possible.

In addition, in the refrigerator and control method thereof of the present disclosure, it may be configured to set different input temperature ranges (ΔT1, ΔT2) depending on the temperature of the storage compartment when the door is opened. Accordingly, it is possible to consider both power consumption and deterioration of stored food at the same time.

In addition, in the refrigerator and the control method thereof of the present disclosure, whether to input the load operation may be determined by using a measured temperature change per unit time. Thereby, concerns about the deterioration of the stored food, which may be caused by a sudden temperature change, are prevented.

In addition, in the refrigerator and the control method thereof of the present disclosure, by controlling the execution time of the load operation differently according to the temperature of the storage compartment after the first door 12a is opened, it is possible to determine the operation start condition by using the accurate temperature sensing value.

In addition, in the refrigerator and the control method thereof of the present disclosure, the elapsed time from closing the first door 12a to the input of the load operation is set differently according to the amount of temperature change per unit time, so that power consumption and the deterioration concerns of stored food may be simultaneously considered.

In addition, in the refrigerator and the control method thereof of the present disclosure, when the operation release condition of the load operation is satisfied at the time the first door 12a is opened, the load operation is released and switched to or maintained the normal storage operation, thereby improving the efficiency of power consumption.

The invention claimed is:

1. A refrigerator comprising:
   a storage compartment;
   a door for opening and closing the storage compartment;
   a temperature sensor for measuring a temperature inside the storage compartment;
   a cooling source for generating cold air that is supplied to the storage compartment; and
   a controller configured to control an amount of the cold air supplied to the storage compartment to increase when an operation start condition of a load operation for the storage compartment is satisfied,
   wherein the controller is configured to control the load operation to start when the temperature inside the storage compartment rises above an input temperature range (ΔT) from a time the door is opened in which the operation start condition is satisfied,
   wherein the input temperature range (ΔT) is set having a different range from a case where the temperature inside the storage compartment at the time the door is opened is in a dissatisfaction region above an upper limit notch temperature (NT+diff) of a satisfaction region that is between the upper limit notch temperature (NT+diff) and a lower limit notch temperature (NT−diff) based on a set notch temperature (NT) and in a case where the temperature is lower than the upper limit notch temperature (NT+diff).

2. The refrigerator of claim 1, further comprises a release operation of the load operation that releases the load operation and switches to the normal storage operation when the operation release condition is satisfied when the door is opened.

3. The method of claim 1, wherein in the operation start condition,
   in response to the temperature inside the storage compartment is in the satisfaction region at the time the door is opened, a temperature rise amount for starting the load operation is set as ΔT1, and in response to a condition for an elapsed time from the time of opening of the door is satisfied and the temperature rises above ΔT1, the load operation starts; and
   in response to the temperature inside the storage compartment is in the dissatisfaction region higher than NT+diff at the time the door is opened, a temperature rise amount for starting the load operation is set as ΔT2, and in response to the condition for the elapsed time from the time of opening of the door is satisfied and the temperature rises above ΔT2, the load operation starts, wherein the ΔT2 is set lower than the ΔT1.

4. A control method of a refrigerator, the method comprising:
   a temperature measurement step to measure a temperature inside a storage compartment;
   a door open confirmation step to check whether a door is open;
   a condition determination step to determine whether an operation start condition of a load operation is satisfied based on the temperature inside the storage compartment; and
   an operation execution step to perform the load operation in response to the operation start condition being satisfied,
   wherein in the condition determination step, it is determined that the operation start condition of the load operation is satisfied in response to a condition for an elapsed time from a time of opening the door is satisfied, and the temperature inside the storage compartment rises above an input temperature range (ΔT), or in response to the
temperature inside the storage compartment is in a dissatisfaction region above an upper limit notch temperature (NT+diff) of a satisfaction region that is between the upper limit notch temperature (NT+diff) and a lower limit notch temperature (NT−diff) based on a set notch temperature (NT),
   wherein in the operation start condition in the condition determination step,
   in response to the temperature inside the storage compartment is in the satisfaction region at the time the door is opened, a temperature rise amount for starting the load operation is set as ΔT1, and in response to a condition for the elapsed time from the time of opening of the door is satisfied and the temperature rises above ΔT1, the load operation starts; and
   in response to the temperature inside the storage compartment is in the dissatisfaction region higher than NT+diff at the time the door is opened, a temperature rise amount for starting the load operation is set as ΔT2, and in response to the condition for the elapsed time from the time of opening of the door is satisfied and the temperature rises above ΔT2, the load operation starts, wherein the ΔT2 is set lower than the ΔT1.

5. The method of claim 4, wherein the satisfaction region is a temperature between the upper limit notch temperature (NT+diff) and the lower limit notch temperature (NT−diff) based on the set notch temperature (NT),
   wherein the dissatisfaction region is a temperature within a preset upper limit temperature which exceeds the upper limit notch temperature (NT+diff).

6. The method of claim 4, wherein the condition for the elapsed time from the opening of the door is within a set time, and the condition determination step is periodically performed within the set time.

7. The method of claim 6, wherein the condition for the elapsed time from the opening the door is after the set time, and the condition determination step is performed after the set time is elapsed.

8. The method of claim 4, wherein the input temperature range ($\Delta T$) is set to satisfy a condition 0<$\Delta T1$ set upper limit temperature−upper limit notch temperature (NT+diff).

9. The method of claim 4, wherein the condition determination step includes:
- a process of counting elapsed time after the door is opened in which the temperature of the storage compartment is equal to or higher than the upper limit notch temperature (NT+diff); and
- a process of determining that the operation start condition is satisfied in which the counted elapsed time reaches a first reference time.

10. The method of claim 4, wherein, the condition determination step includes a process of counting the elapsed time and a process of measuring a temperature change amount ($\Delta T$) per unit time during the counted elapsed time in which the temperature inside the storage compartment is equal to or greater than an upper limit notch temperature (NT+diff) after the door is opened,
- wherein based on the temperature change amount ($\Delta T$)>1, and the counted elapsed time reaching the first set time, the load operation is performed, and based on the temperature change amount ($\Delta T$)<1 and the counted elapsed time reaching the second set time, the load operation is performed,
- wherein the second set time is longer than the first set time.

11. The method of claim 4, wherein in the condition determination step, if it is determined that the operation start condition of the load operation is not satisfied, the load operation is controlled not to be performed.

12. The method of claim 4, wherein if it is determined that the operation start condition of the load operation is not satisfied in the condition determination step, the condition determination step is re-performed after a predetermined period of time elapses.

13. The method of claim 4, wherein the condition determination step to be re-performed is limited to a predetermined set number of times.

14. The method of claim 4, wherein based on a determination that the temperature inside the storage compartment decreases based on the condition determination step being re-performed, the condition determination step is controlled not to be additionally performed.

15. A control method of a refrigerator, the method comprising:
- a temperature measurement step to measure a temperature inside a storage compartment;
- a door open confirmation step to check whether a door is open;
- a condition determination step to determine whether an operation start condition of a load operation is satisfied based on the temperature inside the storage compartment; and
- an operation execution step to perform the load operation in response to the operation start condition being satisfied,
- wherein in the condition determination step, it is determined that the operation start condition of the load operation is satisfied in response to a condition for an elapsed time from a time of opening the door is satisfied, and the temperature inside the storage compartment rises above an input temperature range ($\Delta T$),
- wherein the condition determination step includes:
- a process of counting elapsed time after the door is opened in which the temperature of the storage compartment is equal to or higher than an upper limit notch temperature (NT+diff) of a satisfaction region that is between the upper limit notch temperature (NT+diff) and a lower limit notch temperature (NT−diff) based on a set notch temperature (NT); and
- a process of determining that the operation start condition is satisfied in which the counted elapsed time reaches a first reference time,
- wherein, based on the temperature of the storage compartment≥((NT+diff)+set upper limit temperature)/2 is satisfied after the door is opened, the counted elapsed time is reset to a second reference time, and the second reference time is set to a time shorter than the first reference time.

16. The method of claim 15, wherein in the condition determination step, it is determined that the operation start condition of the load operation is satisfied in response to the temperature inside the storage compartment is in a dissatisfaction region above the upper limit notch temperature (NT+diff) of a satisfaction region.

* * * * *